United States Patent
Zhang et al.

(10) Patent No.: US 11,664,859 B2
(45) Date of Patent: May 30, 2023

(54) METHOD AND DEVICE FOR SWITCHING TRANSMISSION METHODS IN MASSIVE MIMO SYSTEM

(71) Applicant: SAMSUNG ELECTRONICS CO., LTD., Suwon-si (KR)

(72) Inventors: Ranran Zhang, Beijing (CN); Guangyu Sun, Beijing (CN); Zhigang Wang, Beijing (CN); Yan Li, Beijing (CN); Qixin Huang, Beijing (CN); Yan Li, Beijing (CN); Tong Zhou, Beijing (CN); Xiaohui Yang, Beijing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/486,013

(22) Filed: Sep. 27, 2021

(65) Prior Publication Data

US 2022/0103211 A1    Mar. 31, 2022

(30) Foreign Application Priority Data

Sep. 27, 2020   (CN) .......................... 202011035428.1

(51) Int. Cl.
*H04L 1/02*        (2006.01)
*H04B 7/0452*   (2017.01)
*H04B 7/0456*   (2017.01)

(52) U.S. Cl.
CPC ......... *H04B 7/0452* (2013.01); *H04B 7/0456* (2013.01)

(58) Field of Classification Search
CPC ....... H04L 1/003; H04L 1/819; H04L 1/1896; H04L 1/0002; H04L 5/0055; H04W 40/36; H04W 24/02; H04W 4/80; H04W 36/0058; H04B 7/0452; H04B 7/0604; H04B 7/0456; H04B 7/0632; H04B 7/0639; H04B 7/0417
(Continued)

(56) References Cited

U.S. PATENT DOCUMENTS 9,496,939 B2   11/2016   Chen et al.
10,237,045 B2   3/2019   Liu et al.
(Continued)

FOREIGN PATENT DOCUMENTS

KR   10-2019-0116859 A   10/2019
WO   2017223201 A1   12/2017

OTHER PUBLICATIONS

International Search Report (PCT/ISA/210) and Written Opinion (PCT/ISA/237) dated Dec. 29, 2021 issued by the International Searching Authority in International Application No. PCT/KR2021/013139.
(Continued)

*Primary Examiner* — Khai Tran
(74) *Attorney, Agent, or Firm* — Sughrue Mion, PLLC

(57) ABSTRACT

A method for switching transmission methods in a multiple input multiple output (MIMO) system may include: receiving scenario identification related data from a user equipment (UE) in a current transmission method; determining a target transmission method of the UE from at least two predefined transmission methods based on the scenario identification related data; and switching the current transmission method of the UE to the target transmission method.

19 Claims, 16 Drawing Sheets

(58) Field of Classification Search
USPC .................................... 375/267, 260, 262
See application file for complete search history.

(56) References Cited

U.S. PATENT DOCUMENTS

| | | | |
|---|---|---|---|
| 10,686,498 B2 | 6/2020 | Truong et al. | |
| 11,177,863 B2 | 11/2021 | Gao et al. | |
| 2012/0218913 A1 | 8/2012 | Park et al. | |
| 2013/0102342 A1* | 4/2013 | Tesanovic | H04B 7/0658 455/39 |
| 2013/0336201 A1* | 12/2013 | Nishio | H04L 1/1854 370/315 |
| 2014/0369437 A1* | 12/2014 | Horiuchi | H04B 7/0671 375/267 |
| 2015/0171940 A1 | 6/2015 | Park et al. | |
| 2016/0029350 A1* | 1/2016 | Kishiyama | H04L 5/0048 370/329 |
| 2016/0164580 A1* | 6/2016 | El-Najjar | H04W 72/085 375/267 |
| 2017/0078863 A1* | 3/2017 | Kim | H04W 48/16 |
| 2017/0257156 A1 | 9/2017 | Ko et al. | |
| 2018/0368062 A1* | 12/2018 | Koue | H04L 1/20 |
| 2019/0081678 A1 | 3/2019 | Park et al. | |
| 2019/0165983 A1 | 5/2019 | Nakayama | |
| 2020/0228281 A1 | 7/2020 | Choi et al. | |
| 2020/0287639 A1 | 9/2020 | Su et al. | |

OTHER PUBLICATIONS

Communication dated Jan. 18, 2023, issued by the Korean Intellectual Property Office in Korean English Patent Application No. 10-2021-0127537 Translation.

* cited by examiner

FIG. 4

| Sample ID | D1 | D2 | D3 | D4 | ... | |
|---|---|---|---|---|---|---|
| 1 | Slot index | PMI | CQI | PHR | ... | |
| ... | ... | ... | ... | ... | ... | |
| 100,000 | Slot index | PMI | CQI | PHR | ... | |

Scenario identification related data

Characteristic
Reducing redundant (multiple samples within the preset time T are abstracted as one sample)

Calculating variance & calculating average

| Sample ID | X1 | X2 | X3 | X4 | X5 | ... |
|---|---|---|---|---|---|---|
| 1 | Time index | $\varDelta$PMI | $\varDelta$CQI | $\overline{CQI}$ | $\varDelta$PHR | ... |
| ... | ... | ... | ... | ... | ... | ... |
| 150 | Time index | $\varDelta$PMI | $\varDelta$CQI | $\overline{CQI}$ | $\varDelta$PHR | ... |

Scenario identification related characteristic data

FIG. 6A

Inputting the first probability corresponding to each UE

| UE-1 TM first probability | | UE-2 % | UE-3 |
|---|---|---|---|
| TM1 | 54% | % % | ... |
| TM2 | 35% | % % | |
| TM3 | 5% | % | |
| TM6 | 6% | | |

⬇ Joint decision

Outputting joint decision result

| UE pool | UE list |
|---|---|
| TM1 | UE-1, UE-8, UE-10, ... |
| TM2 | UE-2, UE-20, UE-26, ... |
| TM3 | UE-3, UE-5, UE-9, ... |
| etc | UE-n |

METHOD AND DEVICE FOR SWITCHING TRANSMISSION METHODS IN MASSIVE MIMO SYSTEM

CROSS-REFERENCE TO RELATED APPLICATION

The present application claims priority to China Patent Application No. 202011035428.1, filed on Sep. 27, 2020 in the Chinese Patent Office, the disclosure of which is incorporated herein by reference in its entirety.

BACKGROUND

1. Field

The disclosure relates to the field of communication technology, specifically, the disclosure relates to switching transmission methods in a missive multiple input multiple output (MIMO) system.

2. Description of the Related Art

In a New Radio (NR) system, in order to improve system throughput, spectrum efficiency, and transmission reliability, a Massive Multiple Input Multiple Output (Massive MIMO, also referred to as mMIMO) technology is used as a key transmission technology. The Massive MIMO system introduces more physical antennas on the base station side, which is configured with dozens or hundreds of antenna ports, and supports single-user MIMO (SU-MIMO) with single-user spatial diversity and multi-user MIMO (MU-MIMO) transmissions through a beamforming technology.

In the NR Massive MIMO system that supports multiple kinds of Transmission Methods (TMs), one TM may be switched to another TM. However, in a traditional TM switching method, the number of TMs available to be switched to one another are limited, and a selected TM may not be adapted to a current scenario, resulting in a decrease in system throughput and spectrum efficiency performance. Therefore, there has been a demand for improving the traditional TM switching method.

SUMMARY

Embodiments of the present disclosure address at least the above problems and/or disadvantages and other disadvantages not described above. Also, the embodiments are not required to overcome the disadvantages described above, and may not overcome any of the problems described above.

In an embodiment of the present disclosure, a method for switching transmission methods in a multiple input multiple output (MIMO) system, may include: receiving scenario identification related data from a user equipment (UE) in a current transmission method; determining a target transmission method of the UE from at least two predefined transmission methods based on the scenario identification related data; and switching the current transmission method of the UE to the target transmission method.

The at least two predefined transmission methods may include at least two of the following predefined transmission methods: a first transmission method corresponding to single-user MIMO (SU-MIMO) based on Type I codebook feedback Precoding Matrix Indicator (PMI) (Type I codebook PMI based SU-MIMO), a second transmission method corresponding to Multi-User MIMO (MU-MIMO) based on Sounding Reference Signal (SRS) (SRS based MU-MIMO), a third transmission method corresponding to MU-MIMO based on Type II codebook feedback PMI (Type II codebook PMI based MU-MIMO), a fourth transmission method corresponding to SU-MIMO based on SRS (SRS based SU-MIMO), a fifth transmission method corresponding to SU-MIMO based on Type II codebook feedback PMI (Type II codebook PMI based SU-MIMO), a sixth transmission method corresponding to MU-MIMO based on Type I codebook feedback PMI (Type I codebook PMI based MU-MIMO), a seventh transmission method corresponding to Open-loop SU-MIMO, and an eighth transmission method corresponding to Open-loop MU-MIMO.

The scenario identification related data may include at least one of the following data: an SRS channel estimation result, a spatial channel time correlation, a Channel Quality Indicator (CQI), a rank indicator (RI), a PMI, a Signal to Interference Plus Noise Ratio (SINR), an uplink Power Headroom Report (PHR), a Modulation Product Coding Rate (MPR), an Open-loop Rate Control (OLRC), a Reference Signal Receiving Power (RSRP), a Buffer Occupy (BO), a number of user data streams, a number of multi-user data transmission streams, a Modulation and Coding Scheme (MCS), a Block Error Ratio (BLER), a throughput, and a multi-user spatial channel correlation.

The determining the target transmission method may include: performing characteristic abstraction on the scenario identification related data to obtain scenario identification related characteristic data; and determining the target transmission method of the UE based on the scenario identification related characteristic data.

The performing characteristic abstraction on the scenario identification related data may include: obtaining information of a channel quality and a mobility of the UE, from the scenario identification related data to obtain the scenario identification related characteristic data.

The obtaining the information of the channel quality and the mobility of the UE may include: acquiring either one or both of an average and a variance of data values corresponding to the scenario identification related data in time units within a predefined duration, and using either one or both of the average and the variance as the scenario identification related characteristic data.

The determining the target transmission method may include: acquiring a first probability that the UE enables the MIMO system to meet a predetermined transmission performance in each of the at least two predefined transmission methods, based on the scenario identification related data; and determining the target transmission method based on each first probability corresponding to the UE.

The acquiring the first probability may include: inputting the scenario identification related data into an artificial intelligence (AI)-based probability prediction model, and acquiring, as an output of the AI-based probability prediction model, the first probability that the UE obtains a maximum throughput in each of the at least two predefined transmission methods.

The determining the target transmission method may further include: determining the target transmission method based on the first probability corresponding to the UE in each of the at least two predefined transmission methods, in combination with at least one of a terminal capability requirement, a system resource restriction, and a multi-user number requirement of each of the at least two predefined transmission methods.

The determining the target transmission method may further include: adding the UE to a corresponding UE pool of one of the at least two predefined transmission methods that corresponds to a maximum first probability, among each first probability corresponding to the UE; adjusting each first probability corresponding to each UE in the corresponding UE pool to obtain each second probability corresponding to the UE, based on at least one of the terminal capability requirement, the system resource restriction, and the multi-user number requirement of each of the at least two predefined transmission methods; and determining the target transmission method of the UE from the at least two predefined transmission methods based on each second probability corresponding to the UE.

For the one of the at least two predefined transmission methods having the terminal capability requirement, the adjusting each first probability corresponding to each UE in the corresponding UE pool, based on at least one of the terminal capability requirement, system resource restriction, and the multi-user number requirement may include: setting the first probability corresponding to the UE that does not meet the terminal capability requirement in the corresponding UE pool to a predefined value; and adjusting the first probability corresponding to the UE that does not meet the terminal capability requirement in other predefined transmission methods.

For the at least two predefined transmission methods corresponding to SRS based MU-MIMO and SRS based SU-MIMO, the adjusting each first probability corresponding to each UE in the corresponding UE pool, based on the terminal capability requirements of the at least two predefined transmission methods may include: setting the first probability corresponding to the UE having no SRS capability in the UE pool in the at least two predefined transmission methods to the predefined value, and adjusting the first probability corresponding to the UE having no SRS capability in other predefined transmission methods.

For the one of the at least two predefined transmission methods having the system resource restriction, the adjusting the first probability corresponding to each UE in the corresponding UE pool, may include: acquiring a maximum number of UEs corresponding to the system resource restriction, and sorting the UEs in the UE pool in descending order of the first probabilities corresponding to the UEs in the one of the at least two predefined transmission method; and setting a first probability corresponding to a UE with a sequence number greater than the maximum number of UEs in the UE pool in the one of the at least two predefined transmission methods to a predefined value, and adjusting the first probability corresponding to the UE with the sequence number greater than the maximum number of UEs in other predefined transmission methods.

For the at least two predefined transmission methods corresponding to SRS based MU-MIMO and SRS based SU-MIMO, the adjusting each first probability corresponding to each UE in the corresponding UE pool, based on the system resource restriction of the at least two predefined transmission methods may include: acquiring the maximum number of UEs corresponding to the SRS system resource restriction, and sorting the UEs in the UE pool in descending order of the first probabilities corresponding to the UEs in the one of the at least two predefined transmission method; and setting the first probabilities corresponding to the UE with the sequence number greater than the maximum number of UEs in the UE pool in the two predefined transmission methods to the predefined value, and adjusting the first probability corresponding to the UE with the sequence number greater than the maximum number of UEs in other predefined transmission methods.

For the one of the at least two predefined transmission method having the multi-user number requirement, the adjusting the first probability corresponding to each UE in the corresponding UE pool, based on at least one of the terminal capability requirement, system resource restriction, and the multi-user number requirement may include: acquiring a minimum number of UEs corresponding to the multi-user number requirement; and setting the first probabilities corresponding to all UEs in the one of the at least two predefined transmission methods to a predefined value, based on a number of UEs in the UE pool being less than the minimum number of UEs, and adjusting the first probabilities corresponding to all UEs in other predefined transmission methods.

For the at least two predefined transmission methods including a first transmission method, a second transmission method, a third transmission method, and a fourth transmission method that correspond to SRS based MU-MIMO, Type II codebook PMI based MU-MIMO, Type I codebook PMI based MU-MIMO and Open-loop MU-MIMO, respectively, the adjusting the first probability corresponding to each UE in the corresponding UE pool based on at least one of the multi-user number requirements of the first, the second, the third, and the fourth transmission methods may include: acquiring the minimum number of UEs corresponding to the multi-user number requirement; and setting the first probabilities corresponding to all UEs in the first, the second, the third, and the fourth transmission methods to the predefined value, based on the number of UEs in the UE pool being less than the minimum number of UEs, and adjusting the first probabilities corresponding to all UEs in other predefined transmission methods.

The determining the target transmission method of the UE based on each second probability corresponding to the UE may include: determining one of the at least two predefined transmission methods that corresponds to a largest second probability corresponding to the UE as the target transmission method of the UE.

The switching from the current transmission method to the target transmission method may include: transmitting configuration parameters corresponding to the target transmission method to the UE, and performing corresponding scheduling and transmission on the UE.

In an embodiment of the present disclosure, a Multiple Input Multiple Output (MIMO) system may include one or more processor configured to: a receive scenario identification related data from a user equipment (UE) in a current transmission method; determine a target transmission method of the UE from at least two predefined transmission methods based on the scenario identification related data; and switch the current transmission method of the UE to the target transmission method.

In an embodiment of the present disclosure, a non-transitory computer readable storage medium may store a computer program that is executable by one or more processors to perform a method of controlling a user equipment (UE) in a multiple input multiple output (MIMO) system, the method including: obtaining mobility information and channel quality information of the UE in a current transmission method; predicting a probability that the UE obtains a maximum throughput in each of a plurality of transmission methods, by inputting the mobility information and the channel quality information of the UE to an artificial intelligence (AI)-based probability prediction model; determining, as a target transmission method of the UE, one of the plurality of transmission methods that has a higher probability among the probability corresponding to each of the plurality of transmission methods; and switching the current transmission method of the UE to the target transmission method.

The beneficial effects brought about by the technical solution provided in the present disclosure are that, based on the scenario identification related data reported by the UE, the UE determines the target transmission method that matches the scenario, so that during the transmission method switching process, there are more selectable transmission methods, and the throughput and spectral efficiency of the system after switching transmission method are improved.

BRIEF DESCRIPTION OF THE DRAWINGS

The above and/or other aspects will be more apparent by describing certain example embodiments, with reference to the accompanying drawings, in which:

FIG. 4 is a schematic diagram of characteristic abstraction in an example according to an embodiment of the present disclosure;

FIG. 6A is a schematic flowchart of a joint decision of TM at a system-level according to an embodiment of the present disclosure;

DETAILED DESCRIPTION

Figure 1:
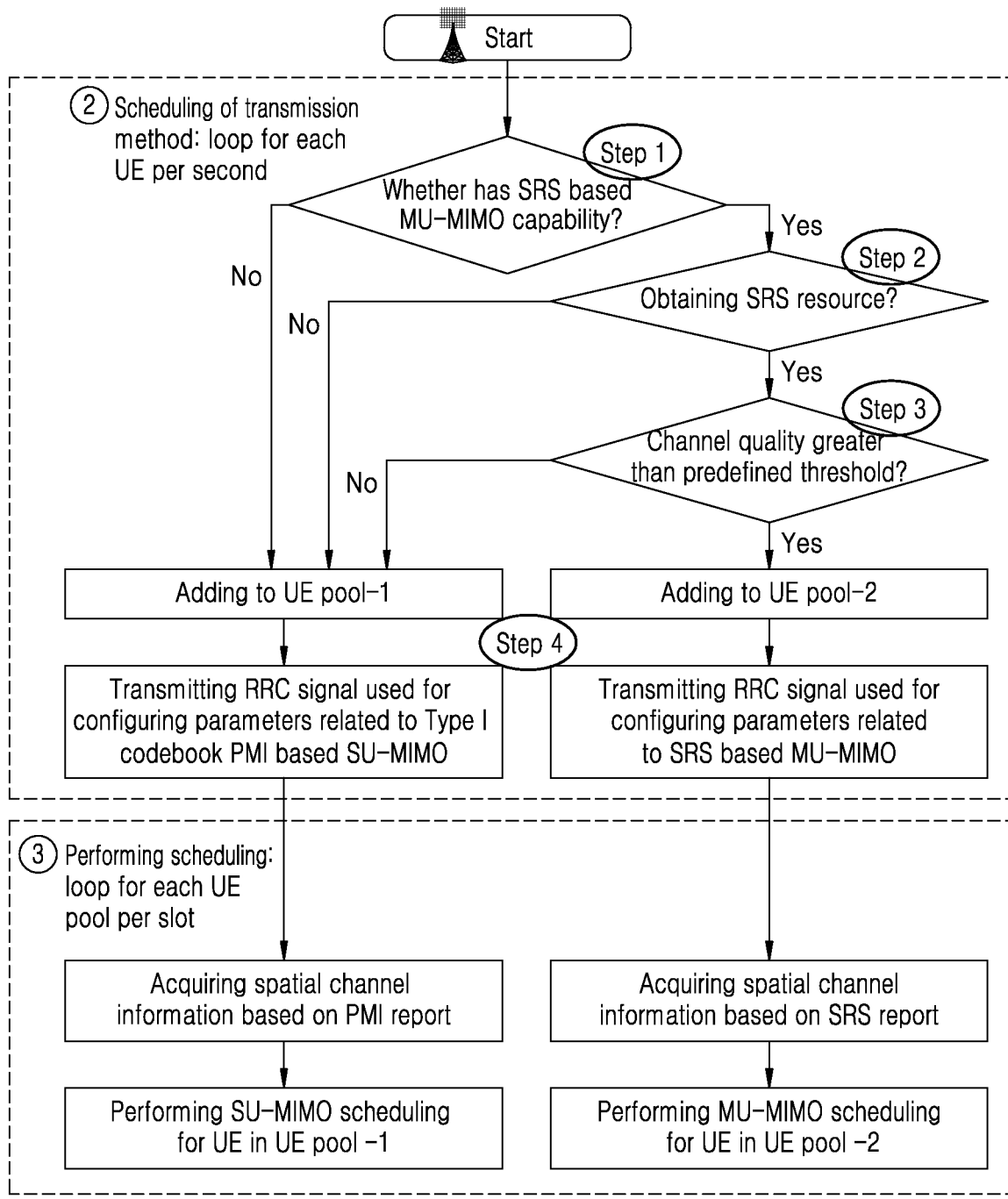
FIG. 1 is a schematic flowchart illustrating a method for switching transmission methods in a massive MIMO system according to an embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Those skilled in the art should understand that the singular forms "a", "an", "said" and "the" include plural referents unless the context clearly dictates otherwise. It should be further understood that the expression "comprising" or "include" used in the specification of the present disclosure means the existence of the characteristics, integers, steps, operations, elements and/or components, but does not preclude the existence or addition of one or more other characteristics, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

In the Massive MIMO system, a beamforming technology is a transmission method in that a transmitter (e.g., a base station) transmits a pilot signal (e.g., a channel state information reference signal) to a receiver (e.g., a user equipment), and obtains spatial channel information (e.g., channel state information) from the receiver which calculates the spatial channel information based on quality of the pilot signal. The transmitter generates transmission precoding suitable for the spatial channel based on the spatial channel information, to improve the signal strength of a receiver and the Signal to Interference Plus Noise Ratio (SINR), or suppress interference to other users who use the same time-frequency resource for transmission by using transmission precoding during the transmission process.

Based on whether multiple users use the same time-frequency resource, the transmission methods used by a NR Physical Downlink Shared Channel (PDSCH) may be divided into single user (SU)-MIMO and multiple user (MU)-MIMO. The SU-MIMO refers to that a cell of a base station transmits data only for one user through the same time-frequency resource, so that only a pair of wireless devices is allowed to simultaneously send or receive multiple data streams. The MU-MIMO refers to that a cell of a base station transmits data for multiple users through the same time-frequency resource, so that multiple wireless devices are allowed to simultaneously send or receive multiple data streams. The MU-MIMO can transmit data for multiple users through the same time-frequency resource, therefore it can support higher data streams, thereby obtaining higher system throughput and spectrum efficiency. Since the SU-MIMO transmits data for only one user through the same time-frequency resource, and the maximum number of transmission data streams depends on the user's maximum number of receiving antennas (generally four data streams), in the case of a large number of users, system throughput and spectrum efficiency of SU-MIMO generally lower than that of MU-MIMO. However, the SU-MIMO has no multi-user interference, therefore the precoding processing is relatively simple and the reliability is high.

Regardless of SU-MIMO or MU-MIMO, in order to determine the corresponding transmission precoding, the spatial channel information needs to be obtained. The NR standard supports multiple methods of obtaining spatial channel information, including the methods described below.

Based on the uplink and downlink channel reciprocity in a Time Division Duplexing (TDD) system, the user equipment transmits a Sounding Reference Signal (SRS), and the base station estimates the uplink spatial channel through the SRS. Since the uplink and downlink of the TDD system uses the same frequency point, and the uplink and downlink spatial channels meet reciprocity, the base station may use the estimated uplink spatial channel as downlink spatial channel information.

For a Frequency Division Duplexing (FDD) system, the uplink and downlink transmission use different frequency points, and the uplink and downlink spatial channels do not meet reciprocity. In the NR standard, the base station transmits a channel state information reference signal (CSI-RS) to the user equipment, and the user equipment performs downlink channel estimation based on the CSI-RS received from the base station. After the user equipment estimates the downlink spatial channel, the spatial channel information is quantized based on the codebook supported in the NR standard, and a corresponding Precoding Matrix Indicator (PMI) is obtained and fed back to the base station. The base station searches the corresponding precoding matrix in the codebook by using the PMI fed back by the user, and uses the corresponding precoding matrix as the downlink spatial channel information.

In order to support different codebook quantization precision, the NR standard includes two types of codebooks, a Type I codebook and a Type II codebook. The Type I codebook is designed based on implicit quantization, with low accuracy and low feedback overhead, and the standardization target thereof is SU-MIMO transmission; the Type II codebook is designed based on explicit quantization with high accuracy and high feedback overhead, and the standardization target thereof is MU-MIMO transmission.

Although the NR standard is different from the Long Term Evolution (LTE) standard, the NR standard does not explicitly define a concept of transmission mode for PDSCH transmission like the LTE standard, but the NR standard implicitly supports multiple transmission methods. For the sake of distinction, the various transmission methods in the NR in the present disclosure are referred to as transmission methods (TMs).

Based on different channel state information acquisition methods, and whether to support the same time-frequency resource for multi-user transmission, the transmission methods supported by NR are listed as follows:

(1) Type I codebook PMI based SU-MIMO, denoted as TM1;

(2) SRS based MU-MIMO, denoted as TM2;

(3) Type II codebook PMI based MU-MIMO, denoted as TM3;

(4) SRS based SU-MIMO, denoted as TM4;

(5) Type II codebook PMI based SU-MIMO, denoted as TM5;

(6) Type I codebook PMI based MU-MIMO, denoted as TM6;

(7) Open-loop SU-MIMO, denoted as TM7; and (8) Open-loop MU-MIMO, denoted as TM8.

TM1~TM8 described in the present disclosure are different from the transmission mode in LTE. In a communication system according to an embodiment, the base station does not need signaling to explicitly inform the user equipment of the used transmission method.

Target application scenarios of the transmission methods TM1~TM4 are as follows:

TM1 is used in SU-MIMO scenario in FDD, and may also be used in scenarios where SRS resources are insufficient or SRS resources need to be saved in TDD system.

TM2 is used in MU-MIMO scenario in TDD.

TM3 is used in MU-MIMO scenario in FDD.

TM4 is used in SU-MIMO scenario in TDD.

In an embodiment of the disclosure, two or more TMs modes including (e.g., TM1 and TM2, or TM1 and TM3) may coexist or may be concurrently used.

When multiple TMs are supported in the Massive MIMO system, the corresponding TM may be selected in different scenarios through an artificial intelligence (AI)-based TM switching method according to embodiments of the disclosure. When the system only needs to handle the coexistence of two TMs, a condition-based TM switching method may be adopted, while moving speed scenario identification is not supported in the condition-based TM switching method itself. In embodiments of the present disclosure, the AI-based TM switching method or the combination of the AI-based TM switching method and the condition-based TM switching method may be used.

Specifically, the condition-based TM switching method is to measure the channel quality and set a decision threshold for the channel quality. When the channel quality meets the decision threshold, one TM is used, otherwise another TM is used. As shown in FIG. 1, for a system where TM1 and TM2 coexist, the TM switching may include the following steps:

① The base station starts to perform the TM switching method and initializes a UE pool-1 corresponding to TM1 and a UE pool-2 corresponding to TM2, respectively.

② The corresponding transmission method is scheduled for each UE in the system, wherein the following scheduling method may be looped for each UE per second, and specifically may include the following steps:

Step 1, a user equipment (UE) without SRS based MU-MIMO capability is added into UE pool-1;

Step 2, for UEs that are not added into the UE pool-1 in step 1, a UE that cannot obtain SRS resources is added into the UE pool-1;

Step 3, for UEs that are not added into the UE pool-1 in step 2, a UE whose channel quality is not greater than a predefined threshold is added into UE pool-1, and other UEs are added into UE pool-2;

Step 4, the UEs in UE pool-1 and UE pool-2 are configured respectively. Specifically, parameters related to Type I codebook PMI based SU-MIMO are transmitted to the UEs in UE pool-1, and parameters related to SRS based MU-MIMO are transmitted to the UEs in UE pool-2.

③ The scheduled transmission method in ② is performed for the UEs in each UE pool. The performing of scheduling may be looped for each UE pool per slot. For the UE pool-1, the spatial channel information is acquired based on the PMI report, and the SU-MIMO scheduling is performed for UEs in UE pool-1; for the UE pool-2, the spatial channel information is acquired based on SRS estimation, and the MU-MIMO scheduling is performed for UEs in UE pool-2.

The condition-based TM switching method by itself may not support TM switching based on moving speed scenario identification because the current speed estimation cannot reach a very accurate level, which will cause TM adaptive misjudgment and ping-pong switching, and thus not only affects performance but also will bring more signaling overhead. For example, if the speed is estimated based on the time correlation (TC) of the space channel, in general, the faster the UE moves, the smaller the space channel time correlation, and the slower the UE moves, the greater space channel time correlation. Therefore, the user movement status information may be obtained roughly through spatial channel time correlation. However, the relationship between the spatial channel time correlation and the user's moving speed is a probabilistic relationship rather than a deterministic relationship.

Figure 2:
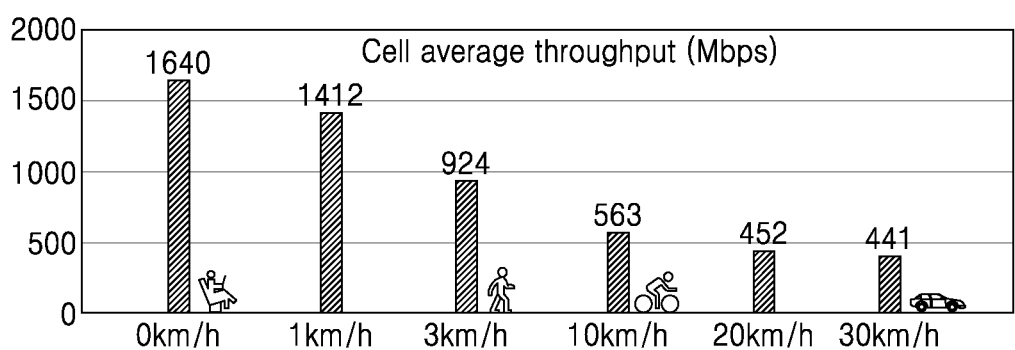
FIG. 2 is a schematic diagram of system throughput using a sounding reference signal (SRS) based multi user (MU)-MIMO method (also referred to as "TM2" in the disclosure) depending on a moving speed of a user equipment (UE)

NR commercial external-field test results show that an NR massive MIMO system using the condition-based TM switching method may achieve very high system throughput and spectral efficiency through SRS based MU-MIMO (TM2) in a fixed-point test. However, in a user mobility test, the throughput and the frequency efficiency of the massive MIMO system drops significantly, as shown in FIG. 2.

This is because that the massive MIMO system is a TDD system in which SRS-based MU-MIMO is used to improve system throughput and frequency efficiency. However, when the user moves, it will bring about the Doppler frequency shift of the wireless channel which causes the time variation of the channel. Therefore, MU-MIMO scheduling relies on the spatial channel information obtained by the SRS channel estimation at the latest time in the past, and the channels during MU-MIMO transmission will be different due to time variation. This phenomenon is called channel obsolescence. The channel obsolescence leads to a decrease in MU-MIMO receiving signal and an increase in multi-user interference, which results in a significant decrease in the performance of SRS based MU-MIMO.

On the other hand, although Type I codebook PMI based SU-MIMO (TM1) is relatively robust when the user equipment moves, and its throughput and spectral efficiency are even higher than TM2 when the user equipment moves at a high speed, there is no reliable speed estimation method, the NR Massive MIMO system does not use speed as the switching condition of the transmission method. The Massive MIMO system still uses TM2 to transmit data for the user when the user moves at a high speed.

In addition, the NR Massive MIMO system generally only supports the coexistence of two transmission methods, and adopts a transmission method adaptation based on condition judgment. Not only is the available transmission method limited, but the selected transmission method may not synthesize multiple scenario factors, therefore the selected transmission method may not be appropriate, which leads to a decrease in system throughput and spectrum efficiency performance.

For the above reasons, it is necessary to find a transmission adaption method that can support more transmission methods to adapt to more scenarios, and the corresponding and appropriate transmission method for various scenarios, especially mobility scenario, can be selected by synthesizing multiple factors, so as to improve the throughput and spectrum efficiency of the Massive MIMO system.

With respect to the above-mentioned problems, the embodiments of the present disclosure provide transmission methods suitable for different scenarios in the mMIMO system. In an embodiment of the disclosure, appropriate transmission methods are used in different scenarios by predicting a transmission method of the physical downlink shared channel (PDSCH) based on artificial intelligence (AI), to improve system transmission throughput and reliability.

The embodiment of the present disclosure is not limited to using only two types of TMs in Massive MIMO, and more types of TMs are introduced for multiple scenarios in the Massive MIMO system to adapt to more scenarios.

For example, based on Type II codebook PMI based MU-MIMO (TM3) and Type I codebook PMI based MU-MIMO (TM6), PMI-based MU-MIMO may be suitable for a FDD Massive MIMO system. TM3 and TM6 in the TDD system may be relatively robust to user mobility performance compared to TM2. When the UE is traveling at a certain moving speed, even in a TDD Massive MIMO system, TM3 or TM6 may perform better than TM2.

Secondly, in an embodiment of the present disclosure, a large amount of scenario related and probability related user data (that is, the scenario identification related data reported by the UE) are input into the AI model to obtain the predicted probabilities of various transmission methods, and an appropriate transmission method is selected for each user by synthesizing various factors in the system, to improve the system throughput and spectrum efficiency in the corresponding scenario, especially to optimize the system throughput and spectrum efficiency of Massive MIMO in the user mobility scenario.

Figure 3:
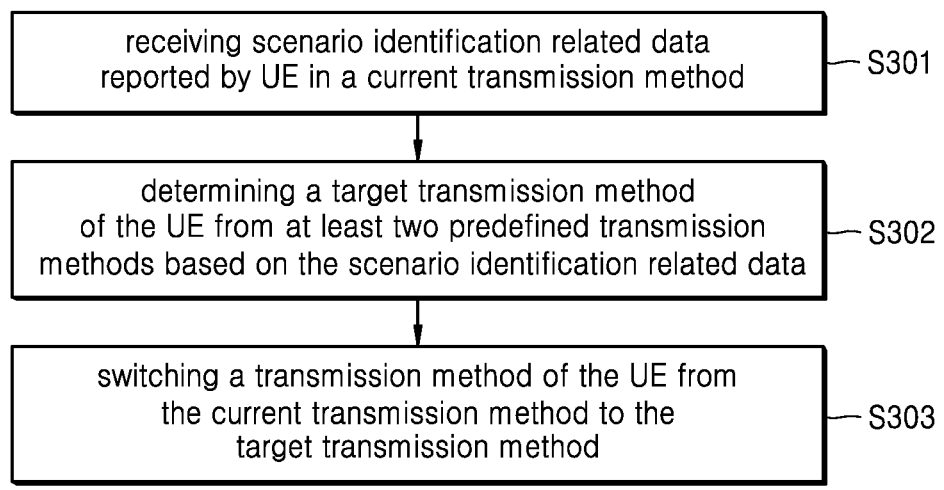
FIG. 3 is a schematic flowchart illustrating a method for switching transmission methods in a massive MIMO system according to an embodiment of the present disclosure.

An embodiment of the present disclosure provides a method for switching transmission methods in an mMIMO system. The execution body of the method may be a base station (such as a gNB or an eNB). As shown in FIG. 3, the method may include the following steps.

In operation S301, scenario identification related data reported by a user equipment (UE) is received in a current transmission method.

The scenario identification related data includes at least one of the following data: an SRS channel estimation result, a spatial channel time correlation, a Channel Quality Indicator (CQI), a rank indicator (RI), a PMI, a Signal to Interference Plus Noise Ratio (SINR), an uplink Power Headroom Report (PHR), a Modulation Product Coding Rate (MPR), an Open-loop Rate Control (OLRC), a Reference Signal Receiving Power (RSRP), a Buffer Occupy (BO), the number of user data streams, the number of multi-user data transmission streams, a Modulation and Coding Scheme (MCS), a Block Error Ratio (BLER), a throughput, and a multi-user spatial channel correlation.

The scenario identification related data reported by each UE in the system in different transmission methods is different. The scenario identification related data may be divided into scenario related data and transmission performance related data. For example, for TM1, the scenario related data reported by the UE includes CQI, RI, PMI, SINR, PHR, MPR, OLRC, RSRP, BO, etc. The transmission performance related data reported by the UE includes the number of user data streams, MCS, BLER, throughput, etc. For TM2, the scenario related data reported by the UE includes SRS channel estimation result, spatial channel time correlation, CQI, RI, PMI, SINR, PHR, MPR, OLRC, RSRP, etc. The transmission performance related data reported by the UE includes the number of user data streams, the number of multi-user data transmission streams, MCS, BLER, throughput, and multi-user spatial channel correlation.

Specifically, the base station receives the scenario identification related data reported by each UE in the system, and determines the corresponding target transmission method for each UE based on the scenario identification related data in the subsequent steps.

In operation S302, a target transmission method of the UE is determined from at least two predefined transmission methods based on the scenario identification related data.

Compared with the related art, the system supports at least two predefined transmission methods (for example, supporting four predefined transmission methods TM1, TM2, TM3, and TM6), so that the UE may switch transmission methods between at least two predefined transmission methods according to embodiments of the present disclosure.

Specifically, for each UE, the base station determines a target transmission method adapted to the current scenario for each UE from the multiple transmission methods supported by the system based on the received corresponding scenario identification related data.

In operation S303, switching a transmission method of the UE from the current transmission method to the target transmission method.

In the method for switching transmission methods, based on the scenario identification related data reported by the UE, the target transmission method that matches the scenario is determined for the UE, so that during the transmission method switching process, there are more selectable transmission methods, and the throughput and spectral efficiency of the system after switching transmission method are improved.

In an embodiment of the present disclosure, operation S302 of determining a target transmission method of the UE from at least two predefined transmission methods based on the scenario identification related data includes: performing characteristic abstraction on the scenario identification related data to obtain corresponding scenario identification related characteristic data; and determining the target transmission method of the UE from the at least two predefined transmission methods based on scenario identification related characteristic data.

The characteristic abstraction is performed on scenario identification related data, and the abstracted data may be referred to as the abstracted scenario identification related data, and may also be referred to as scenario identification related characteristic data.

Performing characteristic abstraction on scenario identification related data to obtain corresponding scenario identification related characteristic data may also be regarded as performing channel quality characteristic abstraction and mobility characteristic abstraction on scenario identification related data to obtain corresponding scenario identification characteristic data. The corresponding scenario may be determined based on the channel quality characteristics and the mobility characteristics. Performing channel quality characteristic abstraction and mobility characteristic abstraction on the scenario identification related data includes: acquiring an average and/or variance of data values corresponding to the scenario identification related data in time units within a predefined duration, and using the average and/or variance as abstracted scenario identification related characteristic data, where the above-mentioned time units may be but not limited to slots.

Wherein, the channel quality related data and the mobility related data respectively include at least one of the following data: SRS channel estimation result, spatial channel time correlation, CQI, RI, SNR, PMI, SINR, PHR, MPR, OLRC, RSRP, BO, the number of user data streams, the number of multi-user data transmission streams, MCS, BLER, throughput and multi-user spatial channel correlation.

Specifically, for data, such as CQI, SINR, RI, PHR, MPR, RSRP, MCS, BLER, throughput, the number of user data streams, the number of multi-user data transmission streams, spatial channel time correlation, multi-user spatial channel correlation and BO, the data values corresponding to each slot within the time range T (i.e., the predefined duration) are averaged to obtain the corresponding average, and/or a variance of the data values corresponding to each slot within the time range T is calculated to obtain the corresponding variance. The time T is a parameter that may be set according to requirements. A signal to noise ratio (SNR) is calculated according to CQI and RI, the SNR values corresponding to each slot within the time range T is averaged to obtain the average SNR, and/or a variance of the SNR values corresponding to each slot within the time range T is calculated to obtain the corresponding SNR variance. For the SRS channel estimation result, the characteristic vector and characteristic value of the channel correlation matrix corresponding to each slot within the time range T are calculated, and an average angle and/or an angle variance of each characteristic vector is calculated.

For example, for a mobility scenario, the base station may receive user data (i.e., scenario identification related data) reported by the UE. Like channel time correlation, these data is related to channel quality and mobility, but the relationship between these data and the mobility scenario is a probabilistic relationship rather than deterministic relationship (the probabilistic relationship corresponding to some data is shown in Table 1), therefore these data cannot be directly used for mobility scenario identification.

TABLE 1

| Scenario identification related data | Channel quality | Mobility |
| --- | --- | --- |
| TC | When the channel quality is poor, TC may be small and change quickly | When UE moves at high speed, TC may be small |
| RI | When the channel quality is good, RI may be large | When UE moves at high speed, RI may be large and change quickly |
| CQI | When the channel quality is good, CQI may be large | When UE moves at high speed, CQI may be large and change quickly |
| PMI | When the channel quality is poor, PMI may be change quickly | When UE moves at high speed, PMI may be change quickly |
| PHR | When the channel quality is poor, PHR may be small and change quickly | When UE moves at high speed, PHR may be change quickly |

Due to the above characteristics, the present disclosure may use an Artificial Intelligence (AI) model to predict a scenario identification and a transmission method based on the above data. Specifically, the characteristic abstraction may be performed firstly on scenario identification related data to obtain the corresponding scenario identification related characteristic data, and the prediction of the scenario identification and the transmission method are performed based on these scenario identification characteristic data. Different characteristic abstraction methods may be applied to different scenario identification data. Some of the data characteristic abstraction methods in Table 1 are shown in Table 2, where a time range T is configurable, such as T contains 200 slots.

TABLE 2

| Scenario identification related data | Channel quality characteristic abstraction | Mobility characteristic abstraction |
| --- | --- | --- |
| TC | Calculating the average and variance of TC within time range T | Calculating the average of TC within time range T |
| RI | — | — |
| CQI | Calculating the average of SNR within time range T, where SNR is derived from RI and CQI | Calculating the variance of SNR within time range T |
| PMI | Calculating the variance of PMI within time range T | Calculating the variance of PMI within time range T |
| PHR | Calculating the average and variance of PHR within time range T | Calculating the variance of PHR within time range T |

As shown in FIG. 4, the scenario identification related data reported by the UE is respectively abstracted using the characteristic abstraction methods in the above-mentioned Table 2 to obtain corresponding scenario identification characteristic data. The scenario identification related characteristic data obtained after characteristic abstraction may be used as an input of the subsequent AI model for prediction of the target transmission method. In FIG. 4, each sample of scenario identification related data in the table on the left corresponds to a Sample ID, such as 1, 2, . . . , 100,000, and each sample corresponds to multiple scenario identification related data, such as D1 (Slot Index), D2 (PMI), D3 (CQI), D4 (PHR), etc. The samples of scenario identification related characteristic data in the table on the right side may be obtained through characteristic abstraction (such as calculating the variance and/or the average). The characteristic abstraction may reduce redundant data, and as shown in FIG. 4, 100,000 sample data are reduced to 150 sample data. Each sample after characteristic abstraction corresponds to multiple scenario identification related characteristic data, such as x1 (Time Index), x2 ($\Delta$PMI), x3 ($\Delta$CQI), x4 ($\overline{CQI}$), x5 ($\Delta$PHR) and so on. Specifically, the variance and/or the average of the data value corresponding to each slot within each predefined period T in the scenario identification related data are calculated to obtain the corresponding scenario identification characteristic data, and in this process, multiple samples within the predefined period T in the table on the left side correspond to one sample in the table on the right side, that is, the amount of data is reduced through characteristic abstraction.

In an embodiment of the present disclosure, the determining a target transmission method of the UE from at least two predefined transmission methods based on the scenario identification related data (may be abstracted scenario identification related data or scenario identification related characteristic data) includes: acquiring a first probability corresponding to the UE enabling the mMIMO system to meet predetermined transmission performance in each predefined transmission method, based on the scenario identification related data; and determining the target transmission method of the UE from the at least two predefined transmission methods based on each first probability corresponding to the UE.

Specifically, determining the target transmission method from multiple predefined transmission methods may be understood as determining a predefined transmission method in which the UE enables the mMIMO system to meet the predetermined transmission performance (for example, enabling mMIMO to obtain the maximum throughput) from the multiple predefined transmission methods, that is, the UE may enable the system to obtain better transmission performance in the determined target transmission method than in other predefined transmission methods. Specifically, according to the scenario identification related data corresponding to the UE, the first probability that the UE enables the system to obtain the maximum throughput in each predefined transmission method is obtained, that is, the UE corresponds to multiple first probabilities. Then, according to the value of each first probability corresponding to the UE, the target transmission method of the UE may be further determined from the predefined transmission methods.

In an embodiment of the present disclosure, the acquiring a first probability corresponding to the UE enabling the mMIMO system to meet predetermined transmission performance in each predefined transmission method, based on the scenario identification related data includes: inputting the scenario identification related data into a predefined probability prediction model, and acquiring the first probability corresponding to the UE obtaining a maximum throughput in each predefined transmission method. The above probability prediction model may be, but not limited to, an AI model, such as a decision tree model, etc.

Figure 5A:
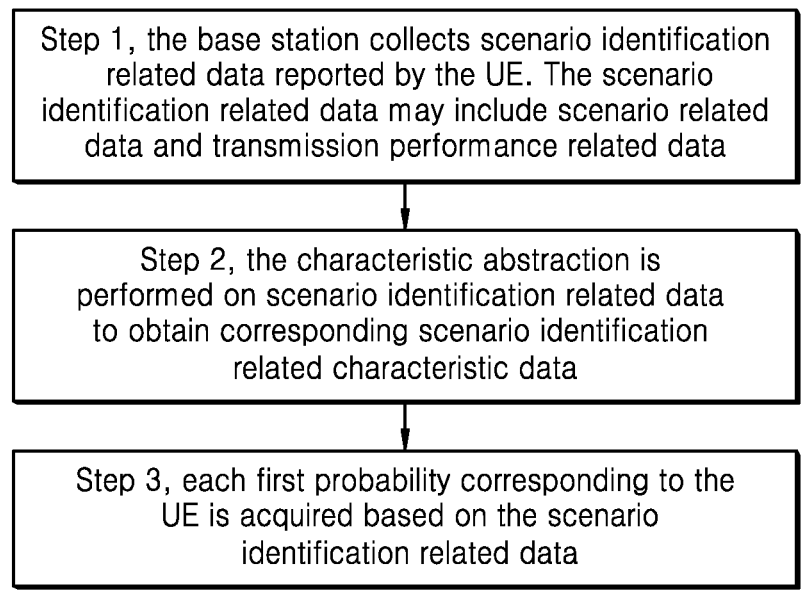
FIG. 5A is a schematic diagram of acquiring the first probability corresponding to the UE according to an example of an embodiment of the present disclosure.

The above-mentioned solution of the present disclosure is further illustrated by using an example below. In this example, the system supports four predefined transmission methods, namely TM1, TM2, TM3, and TM6. As illustrated in FIG. 5A, the process of acquiring each first probability corresponding to the UE may include the following steps.

At Step 1, the base station collects scenario identification related data reported by the UE. The scenario identification related data may include scenario related data and transmission performance related data.

For TM1, the scenario related data includes CQI, RI, PMI, SINK, PHR, MPR, OLRC, RSRP, etc. The transmission performance related data includes the number of user data streams, MCS, BLER, throughput, etc.

For TM2, the scenario related data includes SRS channel estimation result, spatial channel time correlation, CQI, RI, PMI, SINR, PHR, MPR, OLRC, RSRP, etc. The transmission performance related data includes the number of user data streams, the number of multi-user data transmission streams, MCS, BLER, throughput, multi-user spatial channel correlation, etc.

For TM3, the scenario related data includes CQI, RI, PMI, SINK, PHR, MPR, OLRC, RSRP, etc. The transmission performance related data includes the number of user data streams, the number of multi-user data transmission streams, MCS, BLER, throughput, multi-user spatial channel correlation, etc.

For TM6, the scenario related data includes CQI, RI, PMI, SINK, PHR, MPR, OLRC, RSRP, etc. The transmission performance related data includes the number of user data streams, the number of multi-user data transmission streams, MCS, BLER, throughput, multi-user spatial channel correlation, etc.

At Step 2, the characteristic abstraction is performed on scenario identification related data to obtain corresponding scenario identification related characteristic data.

Before the base station uses the collected scenario identification related data to obtain each first probability corresponding to the UE, the characteristic abstraction is performed firstly on the scenario identification related data. The data abstraction methods specifically include calculation of average, calculation of variance, and calculation of characteristic value.

More specifically, for data, such as CQI, SINR, RI, PHR, MPR, RSRP, MCS, BLER, throughput, number of user data streams, number of multi-user data transmission streams, spatial channel time correlation, multi-user spatial channel correlation and BO, the data values corresponding to each slot within the time range T (i.e., the predefined duration) are averaged to obtain the corresponding average, and a variance of the data values corresponding to each slot within the time range T is calculated to obtain the corresponding variance. The time range T is a parameter that may be set according to requirements. A signal to noise ratio (SNR) is calculated according to CQI and RI, the SNR values corresponding to each slot within the time range T is averaged to obtain the average SNR, and a variance of the SNR values corresponding to each slot within the time range T is calculated to obtain the corresponding SNR variance. For the SRS channel estimation result, the characteristic vector and characteristic value of the channel correlation matrix corresponding to each slot within the time range T are calculated, and an average angle and an angle variance of each characteristic vector are calculated.

At Step 3, each first probability corresponding to the UE is acquired based on the scenario identification related data.

Figure 5B:
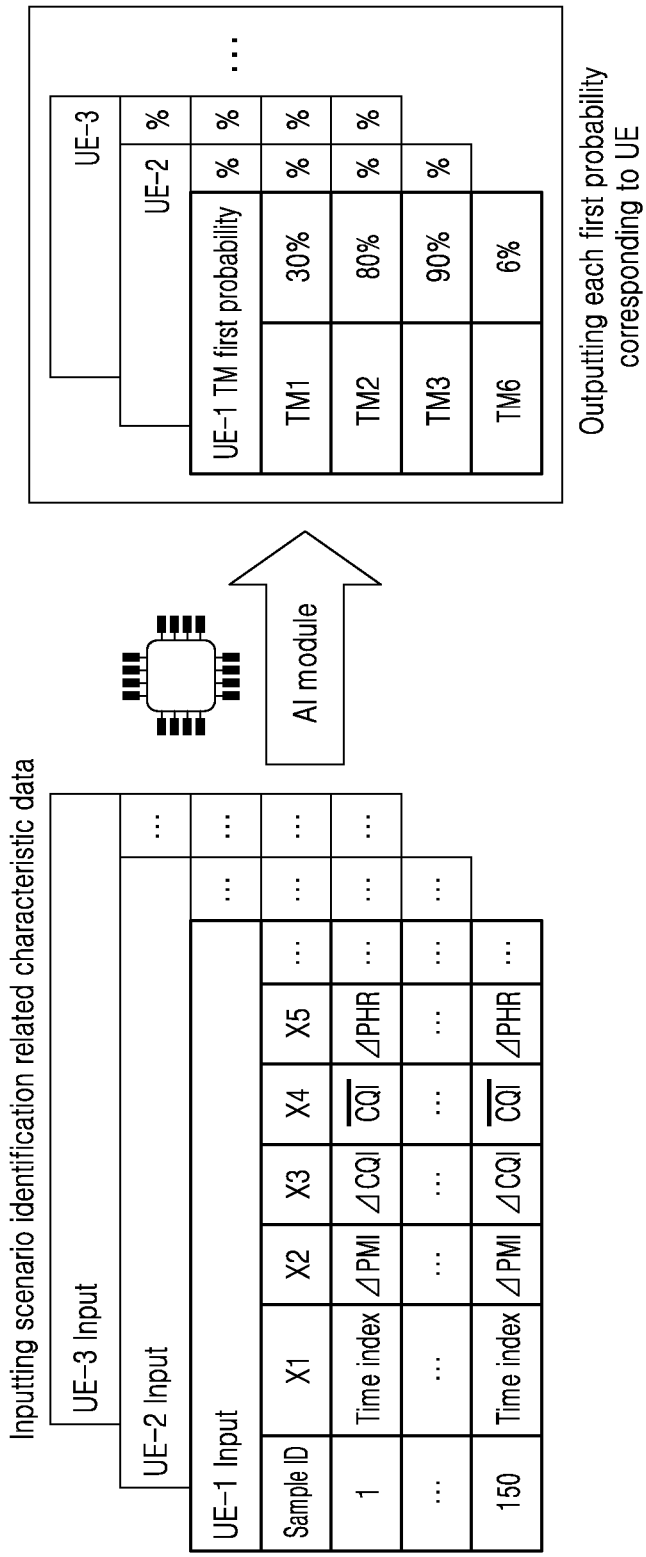
FIG. 5B is a schematic diagram of acquiring the first probability corresponding to the UE through an AI model according to an example of an embodiment of the disclosure.

Specifically, as shown in FIG. 5B, the scenario identification related characteristic data is input into a predefined decision tree model (e.g., a corresponding AI probability prediction model that includes or uses one or more neural networks), and each first probability of obtaining the maximum throughput corresponding to the UE in each predefined transmission method is obtained, that is, the probabilities of TM1, TM2, TM3, and TM6 are used as the target transmission method of the UE respectively.

Figure 5C:
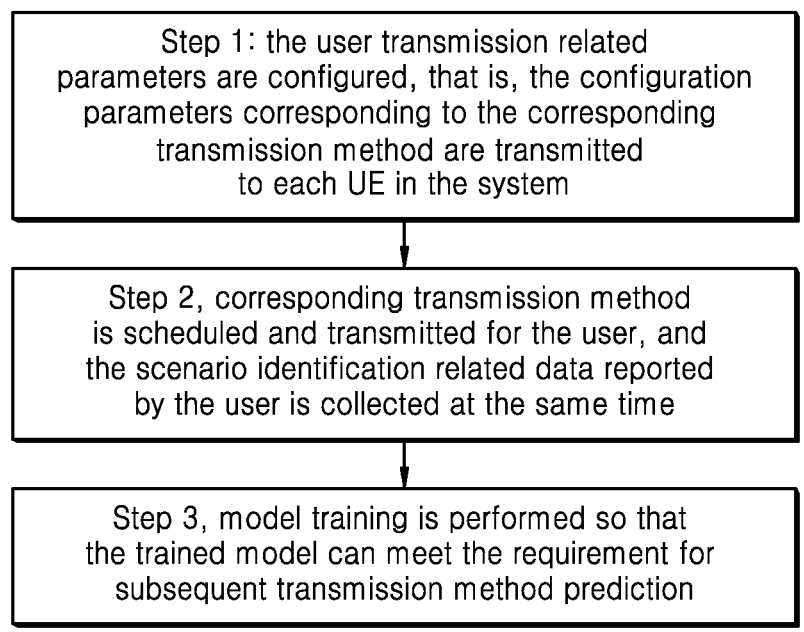
FIG. 5C is a schematic flowchart of the training process of the AI model according to an example of an embodiment of the disclosure.

It should be noted that before using the predefined decision tree model, the predefined decision tree model needs to be trained, as shown in FIG. 5C, the training process may include the following steps.

At Step 1, the user transmission related parameters are configured, that is, the configuration parameters corresponding to the corresponding transmission method are transmitted to each UE in the system.

For TM1, the configuring the parameters related to the transmission method includes: transmitting CSI-RS configuration parameters to user, transmitting Type I codebook configuration parameters, transmitting channel state information (CSI) feedback configuration parameters, and transmitting PDSCH configuration parameters including Demodulation Reference Signal (DMRS) configuration parameters.

For TM2, the configuring the parameters related to the transmission method includes: transmitting SRS configuration parameters, transmitting CSI feedback configuration parameters, and transmitting PDSCH configuration parameters including DMRS configuration parameters.

For TM3, the configuring the parameters related to the transmission method includes: transmitting Type II codebook configuration parameters, transmitting CSI feedback configuration parameters, and transmitting PDSCH configuration parameters including DMRS configuration parameters.

For TM6, the configuring the parameters related to the transmission method includes: transmitting Type I codebook configuration parameters, transmitting CSI feedback configuration parameters, and transmitting PDSCH configuration parameters including DMRS configuration parameters.

If the transmission methods also include TM4, TM5, TM7 and TM8, then:

For TM4, the configuring the parameters related to the transmission method includes: transmitting SRS configuration parameters, transmitting CSI feedback configuration parameters, and transmitting PDSCH configuration parameters including DMRS configuration parameters.

For TM5, the configuring the parameters related to the transmission method includes: transmitting Type II codebook configuration parameters, transmitting CSI feedback configuration parameters, and transmitting PDSCH configuration parameters including DMRS configuration parameters.

For TM7, the configuring the parameters related to the transmission method includes: transmitting Type I codebook configuration parameters, transmitting CSI feedback configuration parameters, and transmitting PDSCH configuration parameters including DMRS configuration parameters.

For TM8, the configuring the parameters related to the transmission method includes: transmitting Type I codebook configuration parameters, transmitting CSI feedback configuration parameters, transmitting PDSCH configuration parameters including DMRS configuration parameters.

For other transmission methods that may be implemented in the NR standard, the corresponding configuration parameters may also be transmitted to the user.

At Step 2, corresponding transmission method is scheduled and transmitted for the user, the scenario identification related data reported by the user is collected at the same time, and corresponding base station log data (including scenario identification related data) is collected for different transmission methods in different scenarios.

For TM1, the scenario related data includes CQI, RI, PMI, SINR, PHR, MPR, OLRC, RSRP, etc. The transmission performance related data includes the number of user data streams, MCS, BLER, throughput, etc.

For TM2, the scenario related data includes SRS channel estimation result, spatial channel time correlation, CQI, RI, PMI, SINR, PHR, MPR, OLRC, RSRP, etc. The transmission performance related data includes the number of user data streams, the number of multi-user data transmission streams, MCS, BLER, throughput, multi-user spatial channel correlation, etc.

For TM3, the scenario related data includes CQI, RI, PMI, SINR, PHR, MPR, OLRC, RSRP, etc. The transmission performance related data includes the number of user data streams, the number of multi-user data transmission streams, MCS, BLER, throughput, multi-user spatial channel correlation, etc.

For TM6, the scenario related data includes CQI, RI, PMI, SINR, PHR, MPR, OLRC, RSRP, etc. The transmission performance related data includes the number of user data streams, the number of multi-user data transmission streams, MCS, BLER, throughput, multi-user spatial channel correlation, etc.

Specifically, for the scenario identification related data reported by the UE, the base station may also perform characteristic abstraction on these data by calculating average, variance, or characteristic value before using them to determine the target transmission method, to obtain the corresponding scenario identification related characteristic data.

More specifically, for data, such as CQI, SINR, RI, PHR, MPR, RSRP, MCS, BLER, throughput, the number of user data streams, the number of multi-user data transmission streams, spatial channel time correlation, multi-user spatial channel correlation and BO, the data values corresponding to each slot within the time range T (i.e., the predefined duration) are averaged to obtain the corresponding average, and/or a variance of the data values corresponding to each slot within the time range T is calculated to obtain the corresponding variance. The time range T is a parameter that may be set according to requirements. A signal to noise ratio (SNR) is calculated according to CQI and RI, the SNR values corresponding to each slot within the time range T is averaged to obtain the average SNR, and/or a variance of the SNR values corresponding to each slot within the time range T is calculated to obtain the corresponding SNR variance. For the SRS channel estimation result, the characteristic vector and characteristic value of the channel correlation matrix corresponding to each slot within the time range T are calculated, and an average angle and/or an angle variance of each characteristic vector is calculated.

At Step 3, the model training is performed so that the trained model can meet the requirement for subsequent transmission method prediction.

The above model may be but not limited to a decision tree model.

The characteristic-abstracted data in step 2 is input into the predefined decision tree model, and the output of the predefined decision tree model is the probabilities corresponding to the four transmission modes of TM1, TM2, TM3, and TM6. In the case where parameters are input in the same scenario, the higher the corresponding transmission throughput, the higher the corresponding probability value of the corresponding transmission mode.

In this example, compared to the condition-based TM switching method, the AI mode-based transmission method probability prediction provided in the embodiment of the present disclosure has the following beneficial effects.

First, the performance of the transmission method in the corresponding scenario may be influenced by a plurality of factors, and the AI-based mode may synthesize various influencing factors to make a comprehensive decision. For example, although the higher the moving speed, the smaller the performance gain of MU-MIMO relative to SU-MIMO, the corresponding speed thresholds when the performance gain of MU-MIMO relative to SU-MIMO disappears are different under different SNRs, and are also different when there is direct radiation or multipath. Even if multiple conditions are introduced in the condition judgment method, it is difficult to properly synthesize multiple conditions. The AI-based mode is suitable for synthesizing multiple influencing factors.

Second, the relationship between various measurement parameters related to user movement scenarios, scattering or multipath scenarios, and high and low channel quality scenarios that can be obtained on the base station side and the conditions influencing the decision of the transmission method, such as user moving speed, scattering or multipath, channel quality, and spatial correlation, is generally a probabilistic relationship rather than a deterministic relationship.

For example, the higher the moving speed, the smaller the value of the channel time correlation, but the moving speed and the channel time correlation are not a fixed dependency. For example, the spatial correlation value corresponding to a moving speed of 3 kilometers per hour may not necessarily be less than the spatial channel correlation value corresponding to a moving speed of 1 kilometers per hour. The AI-based method can synthesize the probability factors related to scenario decision, and output a comprehensive probability prediction, so as to make full use of effective information and improve the accuracy of judgment.

Third, the embodiment of the disclosure does not directly input the parameters measured by the base station into the AI model for training or prediction, but performs characteristic-based preprocessing (the above-mentioned characteristic abstraction) on the data. Through the preprocessing of data characteristics, at least one or more of the following benefits may be obtained.

(1) The data characteristic abstraction can greatly reduce the amount of data while maintaining the amount of information, which may reduce the memory requirements related to the AI processing module.

(2) The data characteristic abstraction can reduce invalid and interfering data in the data greatly, while maintaining the amount of information, which may improve the budget accuracy related to the AI processing module.

(3) Through data characteristic abstraction, the processing complexity of the AI module will be reduced accordingly.

In addition, the method may also include the initialization of the user pools (i.e., the UE pools) of multiple transmission methods, including user pools of TM1, TM2, TM3 and TM6.

Due to the introduction of multiple transmission methods of TM1, TM2, TM3 and TM6, compared with the related art in which only one method of obtaining spatial channel state information is used for MU-MIMO users (in a TDD system, SRS is used to obtain spatial channel state information by using channel reciprocity; in a FDD system, a PMI feedback method is used to obtain spatial channel state information), the embodiments of the present disclosure support the use of multiple methods of obtaining spatial channel state information for SU-MIMO or MU-MIMO, especially in the TDD system, the PMI feedback method is also used to obtain spatial channel state information.

Because SU-MIMO and MU-MIMO have different requirements for the accuracy of spatial channel state information, and also have different sensitivity to the obsolescence of spatial channel state information brought about by mobility in the mobility scenario. An appropriate method of obtaining spatial channel state information may be selected from multiple methods of obtaining spatial channel state information according to different scenarios and states of users.

Specifically, the quantization accuracy of the spatial channel state information based on the Type I codebook PMI feedback is lower than that of the spatial channel state information based on the Type II codebook PMI feedback, but the spatial channel state information based on the Type I codebook PMI feedback is relatively more robust to user's mobility than that based on Type II codebook PMI feedback.

The quantization accuracy of spatial channel state information based on Type II codebook PMI feedback is lower than that of SRS based spatial channel state information, but the spatial channel state information based on the Type II codebook PMI feedback is relatively more robust to user's mobility than SRS based spatial channel state information.

The spectral efficiency of SU-MIMO is generally lower than that of MU-MIMO, but SU-MIMO is relatively more robust to user's mobility than MU-MIMO.

When the system includes multiple transmission methods of combination of channel state information acquisition methods and SU/MU-MIMO, users may select an appropriate transmission method according to the specific scenario. If the transmission method is selected appropriately, the system may obtain the best performance of the candidate transmission method with the best transmission performance in various scenarios.

The above embodiments describe the process for the base station to obtain the first probability corresponding to each UE, which may be understood as the probability prediction of the transmission method at the user-level. After this, it is necessary to further comprehensively consider decision factors, such as the terminal capability requirement, system resource restriction, and multi-user number requirement, to obtain the user list of the user pool of each transmission method, that is, to determine the appropriate transmission method for each user in the system. This process may be understood as a joint decision of the transmission method at the system-level, to obtain the UE list in the UE pool of the transmission method, as shown in FIG. 6A.

In an embodiment of the present disclosure, the determining the target transmission method of the UE from the at least two predefined transmission methods based on each first probability corresponding to the UE includes: determining the target transmission of the UE from the at least two predefined transmission methods based on each first probability corresponding to the UE, and in combination with at least one of terminal capability requirement, system resource restriction, and multi-user number requirement of each predefined transmission method.

Further, the UE is added to a corresponding UE pool of the predefined transmission method corresponding to the maximum first probability, based on each first probability corresponding to the UE; each first probability corresponding to each UE in the corresponding UE pool is adjusted to obtain each second probability corresponding to the UE, based on at least one of the terminal capability requirement, system resource restriction, and the multi-user number requirement of each predefined transmission method; and the target transmission method of the UE is determined from the at least two predefined transmission methods based on each second probability corresponding to the UE.

Specifically, after acquiring each first probability corresponding to each UE, each UE is added to the corresponding UE pool of the predefined transmission method corresponding to the maximum first probability. For example, for a UE1, the first probabilities in the four TMs (TM1, TM2, TM3, and TM6) supported by the system are 0.6, 0.2, 0.1, and 0.1 respectively. Then, UE1 is added to the UE pool corresponding to TM1.

Figure 6B:
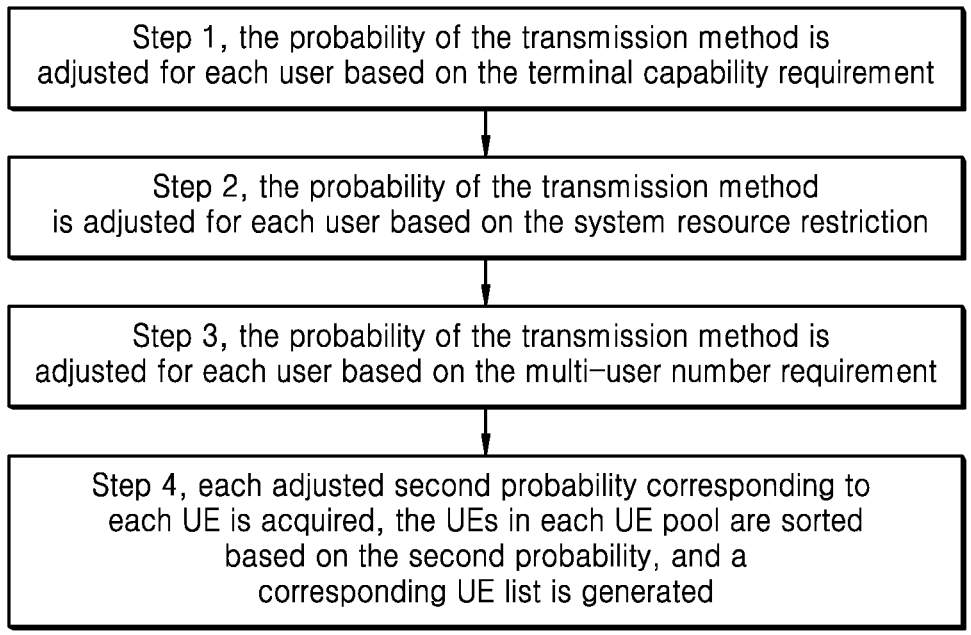
FIG. 6B is a schematic diagram of adjusting the probabilities of UEs in the UE pool in each predefined method according to an embodiment of the disclosure.

Then the first probability of each UE in the corresponding UE pool is adjusted according to the decision factors such as terminal capability requirement, system resource restriction, and multi-user number requirement corresponding to each transmission method, that is, the above-mentioned detection of terminal capability requirement, system resource restriction and multi-user number requirement is performed on the corresponding UE, and then the first probability is adjusted based on the above detection result to obtain each second probability corresponding to each UE, and finally the target transmission method corresponding to the UE is determined based on the second probability. Specifically, as shown in FIG. 6B, the above detection process may include the following steps:

At Step 1, the probability of the transmission method is adjusted for each user based on the terminal capability requirement, that is, the probability for the UE in the UE pool of the predefined transmission method having the terminal capability requirement is adjusted.

At Step 2, the probability of the transmission method is adjusted for each user based on the system resource restriction, that is, the probability for the UE in the UE pool of the predefined transmission method having the system resource restriction is adjusted.

At Step 3, the probability of the transmission method is adjusted for each user based on the multi-user number requirement, that is, the probability for the UE in the UE pool of the predefined transmission method having the multi-user number requirement is adjusted.

At Step 4, each adjusted second probability corresponding to each UE is obtained, the UEs in each UE pool are sorted based on the second probability, and a corresponding UE list is generated.

In the above embodiment, through the joint decision of the transmission method at the system-level, the best transmission method is selected for different scenarios from the user and system views, instead of only considering the user views. The following will describe in detail each detection process in the joint decision.

In an embodiment of the present disclosure, for the predefined transmission method having terminal capability requirement, the adjusting each first probability corresponding to each UE in the corresponding UE pool, based on at least one of the terminal capability requirement, system resource restriction, and the multi-user number requirement of the predefined transmission method includes: setting the first probability corresponding to the UE that does not meet the terminal capability requirement in the UE pool in the predefined transmission method to a predefined value, and adjusting the first probability corresponding to the UE that does not meet the terminal capability requirement in other predefined transmission methods.

Further, In an embodiment of the present disclosure, for the predefined transmission methods corresponding to SRS based MU-MIMO and SRS based SU-MIMO, the adjusting each first probability corresponding to each UE in the corresponding UE pool, based on the terminal capability requirements of the two predefined transmission methods includes: setting the first probability corresponding to the UE having no SRS capability in the UE pool in the two predefined transmission methods to the predefined value, and adjusting the first probability corresponding to the UE having no SRS capability in other predefined transmission methods.

For example, for TM1, TM2, TM3, and TM6, the requirements for terminal capabilities of each predefined transmission method are shown in Table 3.

TABLE 3

| Predefined transmission method | Terminal capability requirement |
| --- | --- |
| TM1 | No requirement |
| TM2 | SRS capability requirement |
| TM3 | CSI-RS capability requirement, Codebook capability requirement |
| TM6 | No requirement |

Then, for TM2, the first probability corresponding to UEs that do not meet the SRS capability requirement in the UE pool corresponding to TM2 is adjusted to 0 (that is, the predefined value is 0), and the first probabilities corresponding to these UEs in TM1, TM3, and TM6 are adjusted, to obtain the corresponding second probability, such that the sum of the second probabilities corresponding to each UE is 1. For TM3, the first probability corresponding to UEs that do not meet the CSI-RS capability requirement and/or codebook capability requirement in the UE pool corresponding to TM3 is adjusted to 0 (that is, the predefined value is 0), and the first probabilities corresponding to these UEs in TM1, TM2, TM3, and TM6 are adjusted, to obtain the corresponding second probabilities, such that the sum of the second probabilities corresponding to each UE is 1.

If the TMs supported by the system do not include TM3, for example, only including TM1, TM2, and TM6, then the requirements for terminal capabilities are reduced. In the case that the Type II codebook is not currently supported in the terminal, it may reduce the training difficulty of the AI model and reduce the complexity of the system.

It should be noted that, in this embodiment, the checking of terminal capability requirement in the joint decision of transmission method at the system-level may also be performed before the probability prediction of the transmission method at the user-level. For example, AI models that only support TM2 and TM3 may be trained and acquired firstly, and then terminal capability checking is performed on UEs in the system to acquire UEs that do not meet SRS capability requirement, CSI-RS capability requirement, and/or codebook capability requirement. The scenario identification characteristic data of these UEs are input into AI models that only support TM2 and TM3, and the first probability corresponding to each UE is output. In the subsequent joint decision of the transmission method at system-level, the terminal capability requirement checking is unrequired.

The terminal capability requirement checking being performed before the probability prediction of the transmission method at user-level has the advantage that the different capabilities of the UE may be considered in the AI model training, making the AI model training and prediction more accurate.

Users with different capabilities may use different AI models. Different AI models may be judged separately when judging whether an AI model is valid. Only the user corresponding to the corresponding invalid AI model terminates the AI-based transmission method adaptation, and returns to the condition-based transmission method adaptation mode based on conditional judgment.

When the AI-based transmission method adaptation and the condition-based transmission method adaptation coexist, the transmission method adaptation of the user to whom the AI transmission method is valid is completed firstly based on the condition judgment, and these users are added to the corresponding resource pool (i.e., UE pool) of the transmission method that completes the decision. When jointly processed with users with the AI-based transmission method adaption, these users can be regarded as users whose transmission method probability is 1. For example, if the AI-based transmission method adaptation is valid for a UE, the condition-based transmission method adaption is applied to obtain the corresponding target transmission method corresponding to the UE, and the UE is added to the UE pool of the corresponding target transmission method. In the subsequent joint decision process of the system-level transmission method, the corresponding first probability in the target transmission method is set to 1.

The embodiment of the present disclosure provides that when training an AI model, UEs with multiple user capabilities may be selected for training, for example, UEs with only TM1 capability, UEs with only TM1 and TM2 capabilities, UEs with only TM1 and TM6 capabilities, UEs with only TM1, TM6 and TM2 capabilities, and UEs with all TM capabilities. For different user capabilities, different AI model training results may be obtained.

In an embodiment of the present disclosure, for the predefined transmission methods having system resource restriction, the adjusting the first probability corresponding to each UE in the corresponding UE pool, based on at least one of the terminal capability requirement, system resource restriction, and the multi-user number requirement of the predefined transmission method includes: acquiring the maximum number of UEs corresponding to the system resource restriction, and sorting the UEs in the UE pool in descending order of the first probabilities corresponding to the UEs in the predefined transmission method; and setting a first probability corresponding to a UE with sequence number greater than the maximum number of UEs in the UE pool in the predefined transmission method to the predefined value, and adjusting the first probability corresponding to UE with sequence number greater than the maximum number of UEs in other predefined transmission methods.

Further, for the predefined transmission methods corresponding to SRS based MU-MIMO and SRS based SU-MIMO, the adjusting each first probability corresponding to each UE in the corresponding UE pool, based on the system resource restriction of the two predefined transmission methods includes: acquiring the maximum number of UEs corresponding to the SRS system resource restriction, and sorting the UEs in the UE pool in descending order of the first probabilities corresponding to the UEs in the predefined transmission method; and setting the first probabilities corresponding to the UE with sequence number greater than the maximum number of UEs in the UE pool in the two predefined transmission methods to the predefined value, and adjusting the first probability corresponding to UE with sequence number greater than the maximum number of UEs in other predefined transmission methods.

Figure 7A:
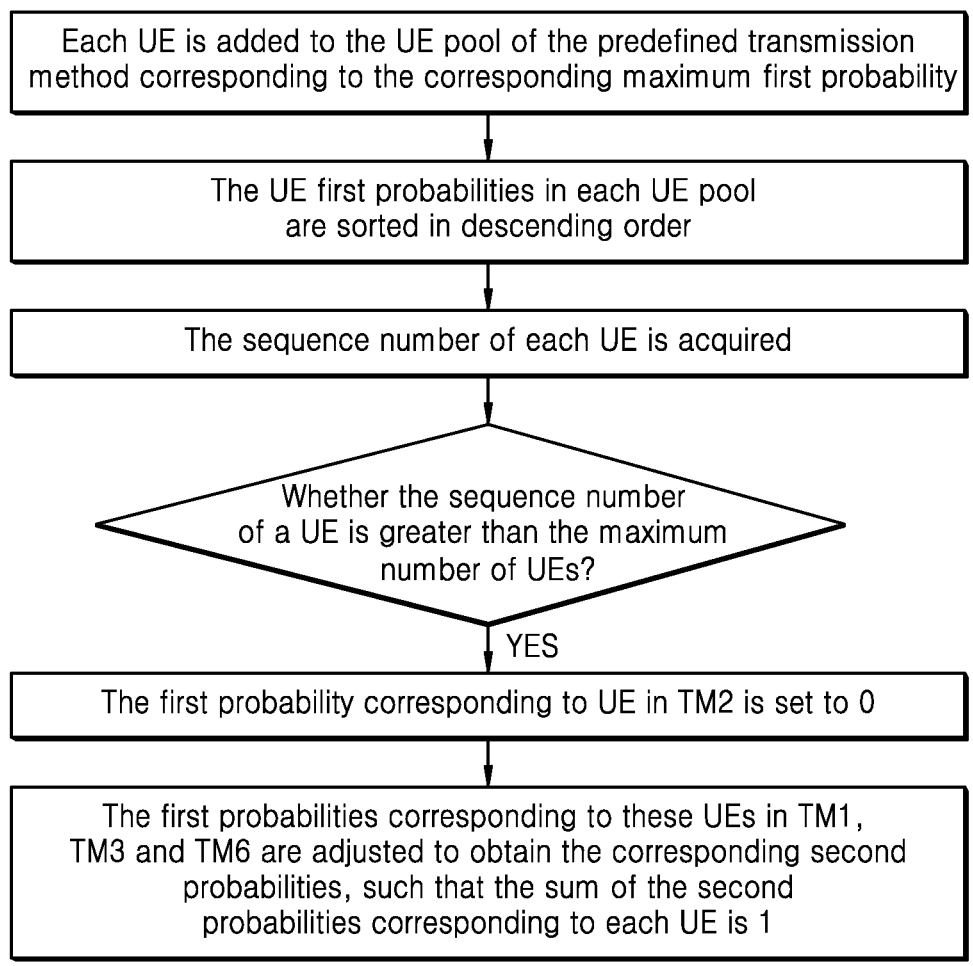
FIG. 7A is a schematic flowchart of system resource restriction checking according to an example of an embodiment of the present disclosure.
Figure 7B:
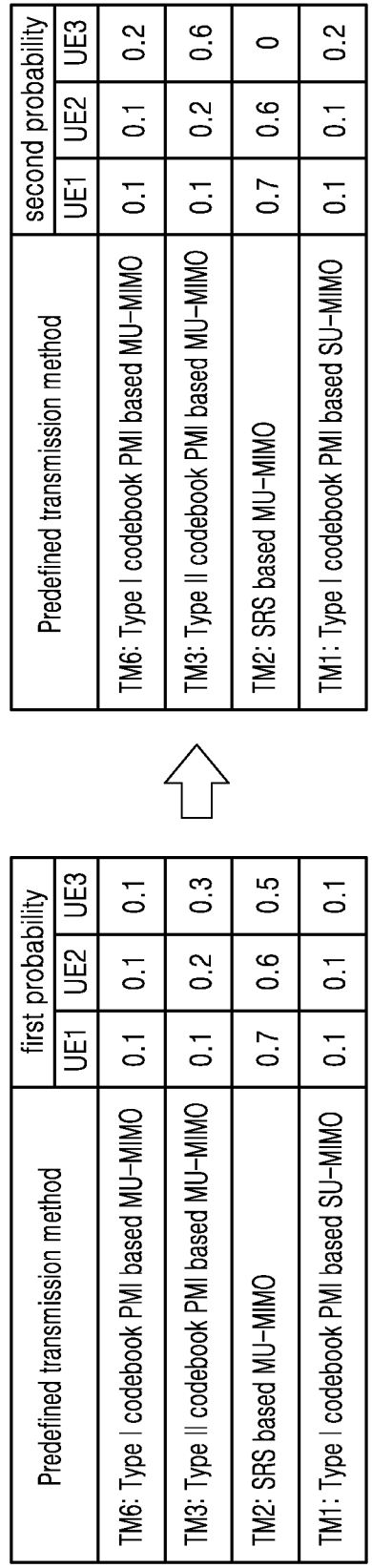
FIG. 7B is a schematic diagram of adjusting the first probability in the system resource restriction checking according to an example of an embodiment of the disclosure.

Specifically, for example, for TM2, the system resource restriction of the predefined transmission method is the maximum number of SRS, and the corresponding maximum number of UEs is 2, as shown in FIG. 7A. After each UE is added to the UE pool of the predefined transmission method corresponding to the maximum first probability based on the first probability of each UE, the UE first probabilities in each UE pool are sorted in descending order, and whether the sequence number of each UE is greater than the maximum number of UEs (i.e., 2) is determined. If the number of UEs in the UE pool is greater than 2, the first probability of each UE with a sequence number greater than 2 in TM2 is set to 0, and the first probabilities of these UEs in TM1, TM3 and TM6 are adjusted to obtain the corresponding second probabilities, such that the sum of the second probabilities corresponding to each UE is 1. The specific probability adjustment is shown in FIG. 7B. The first probability of UE3 in the UE pool corresponding to TM2 is adjusted. Since its sequence number 3 is greater than the maximum number of UEs (i.e., 2), its probability in TM2 is set to 0, and the first probabilities in TM1, TM3 and TM6 are adjusted to 0.2, 0.6, and 0.2 respectively, that is, the second probabilities corresponding to UE3 are 0.2, 0.6, and 0.2 respectively.

In an embodiment of the present disclosure, for the predefined transmission method having multi-user number requirement, the adjusting the first probability corresponding to each UE in the corresponding UE pool, based on at least one of the terminal capability requirement, system resource restriction, and the multi-user number requirement of the predefined transmission method includes: acquiring a minimum number of UEs corresponding to the multi-user number requirement; and setting the first probabilities corresponding to all UEs in the predefined transmission method to the predefined value, if the number of UEs in the UE pool is less than the minimum number of UEs, and adjusting the first probabilities corresponding to all UEs in other predefined transmission methods.

Further, for predefined transmission methods corresponding to SRS based MU-MIMO, Type II codebook PMI based MU-MIMO, Type I codebook PMI based MU-MIMO and Open-loop MU-MIMO, the adjusting the first probability corresponding to each UE in the corresponding UE pool based on at least one of the multi-user number requirements of the four transmission methods includes: acquiring a minimum number of UEs corresponding to the multi-user number requirement; and setting the first probabilities corresponding to all UEs in the four predefined transmission methods to the predefined value, if the number of UEs in the UE pool is less than the minimum number of UEs, and adjusting the first probabilities corresponding to all UEs in other predefined transmission methods.

Figure 8A:
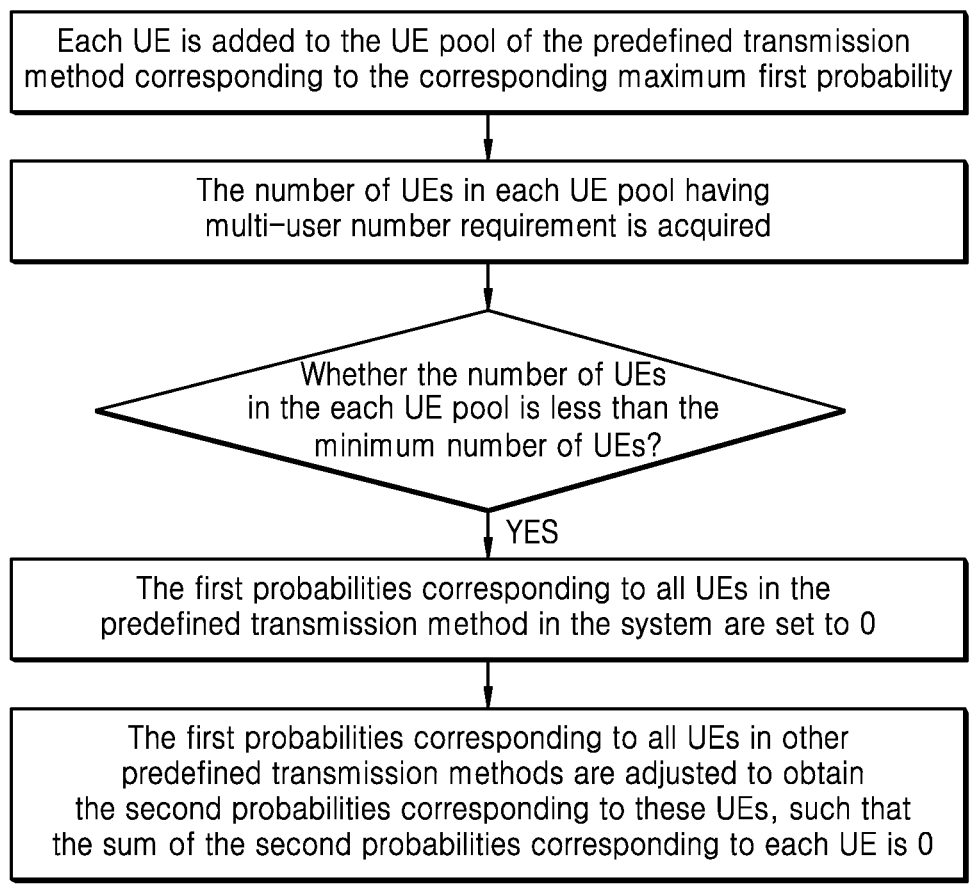
FIG. 8A is a schematic flowchart of multi-user number requirement checking according to an example of an embodiment of the disclosure.

Specifically, as shown in FIG. 8A, after each UE is added to the UE pool of the predefined transmission method corresponding to the maximum first probability based on the first probability corresponding to each UE, for a UE pool corresponding to the TM having multi-user number requirement, the corresponding minimum number of UEs is obtained, and the number of UEs in the corresponding UE pool is compared with the minimum number of UEs. If the number of UEs in the UE pool is less than the minimum number of UEs, the first probabilities corresponding to all UEs in the predefined transmission method in the system are set to 0, and the first probabilities corresponding to all UEs in other predefined transmission methods are adjusted to obtain the second probabilities corresponding to these UEs, such that the sum of the second probabilities corresponding to each UE is 0.

Figure 8B:
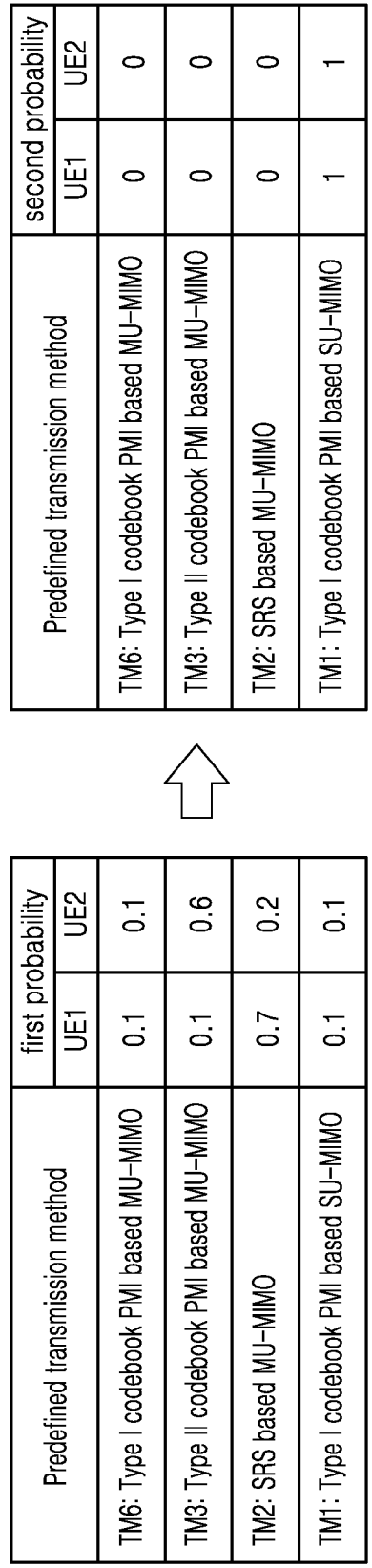
FIG. 8B is a schematic diagram of adjusting the first probability in the multi-user number requirement checking according to an example of an embodiment of the disclosure.

For example, the predefined transmission methods in the system are TM1, TM2, TM3, and TM6, where TM2, TM3, and TM6 have multiple user number requirements, and the corresponding minimum number of UEs is 3, as shown in FIG. 8B. It can be seen that from the first probability corresponding to each UE, the UE pool corresponding to TM2 contains UE2, and the UE pool corresponding to TM3 contains UE1, that is, the total number of UEs in the UE pool corresponding to TM2, TM3, and TM6 is 2, which is less than the minimum number (e.g., 3) of UEs. Therefore, the first probabilities corresponding to all UE1 and UE2 in TM2, TM3, and TM6 are all set to 0, and the first probabilities corresponding to UE1 and UE2 in TM1 are adjusted to obtain the second probabilities corresponding to UE1 and UE2 respectively.

In an embodiment of the present disclosure, the determining the target transmission method of the UE from the at least two predefined transmission methods based on each second probability corresponding to the UE includes: determining the predefined transmission method corresponding to the largest second probability corresponding to the UE as the target transmission method of the UE.

Specifically, after each second probability corresponding to each UE in the system is obtained, the predefined transmission method corresponding to the largest second probability of each UE is determined as its target transmission method. In other words, the UE may also be added to the UE pool of the predefined transmission method corresponding to the corresponding maximum second probability, to obtain the UE pool whose predefined transmission method is updated. The target transmission method of UE in the UE pool in each predefined transmission method is the predefined transmission method corresponding to the UE pool where it is located.

In an embodiment of the present disclosure, the switching the transmission method of the UE from the current transmission method to the target transmission method includes: transmitting configuration parameters corresponding to the target transmission method to the UE, and performing corresponding scheduling and transmission on the UE.

Specifically, firstly, according to the target transmission method determined for each UE in the foregoing embodiment, the configuration parameters corresponding to the target transmission method are transmitted to the user.

Specifically, for a UE whose target transmission method is TM1, configuring parameters related to the transmission method, includes transmitting CSI-RS configuration parameters to UE, transmitting Type I codebook configuration parameters, transmitting channel state information (CSI) feedback configuration parameters, and transmitting PDSCH configuration parameters including Demodulation Reference Signal (DMRS) configuration parameters. Through the PMI reported by the UE, the base station obtains the spatial channel information of the UE.

For a UE whose target transmission method is TM2, the configuring the parameters related to the transmission method includes: transmitting SRS configuration parameters, transmitting CSI feedback configuration parameters, and transmitting PDSCH configuration parameters including DMRS configuration parameters to the UE. Through the SRS transmitted by the UE, the base station obtains the spatial channel information of the UE.

For a UE whose target transmission method is TM3, the configuring the parameters related to the transmission method includes: transmitting Type II codebook configuration parameters, transmitting CSI feedback configuration parameters, and transmitting PDSCH configuration parameters including DMRS configuration parameters to UE. Through the PMI reported by the UE, the base station obtains the spatial channel information of the UE.

For a UE whose target transmission method is TM6, the configuring the parameters related to the transmission method includes: transmitting Type I codebook configuration parameters, transmitting CSI feedback configuration parameters, and transmitting PDSCH configuration parameters including DMRS configuration parameters to the UE. Through the PMI reported by the UE, the base station obtains the spatial channel information of the UE.

Then, the scheduling and transmission of the target transmission method for the UE is performed, and the scenario identification related data reported by the UE is collected at the same time. These scenario identification related data may be used to determine whether the AI-based TM switching method in an embodiment is valid, and may also be further used as data for AI model training.

Specifically, for a UE whose target transmission method is TM1, the SU-MIMO scheduling and transmission is performed.

For TM2, TM3, and TM6 UEs, the MU-MIMO scheduling and transmission is performed.

During the transmission process, the scenario identification related data collection and characteristic abstraction in the above-mentioned embodiment are performed successively and simultaneously to prepare for the next transmission method decision cycle. At the same time, based on the detection of throughput and UE transmission performance, it is determined whether the AI-based transmission method switching method in the present application is valid. For example, if some UEs successively generate error codes and the system throughput thereof decreases, the validity of the AI-based TM switching method may be terminated, and it returns to a condition-based TM switching method.

Figure 9:
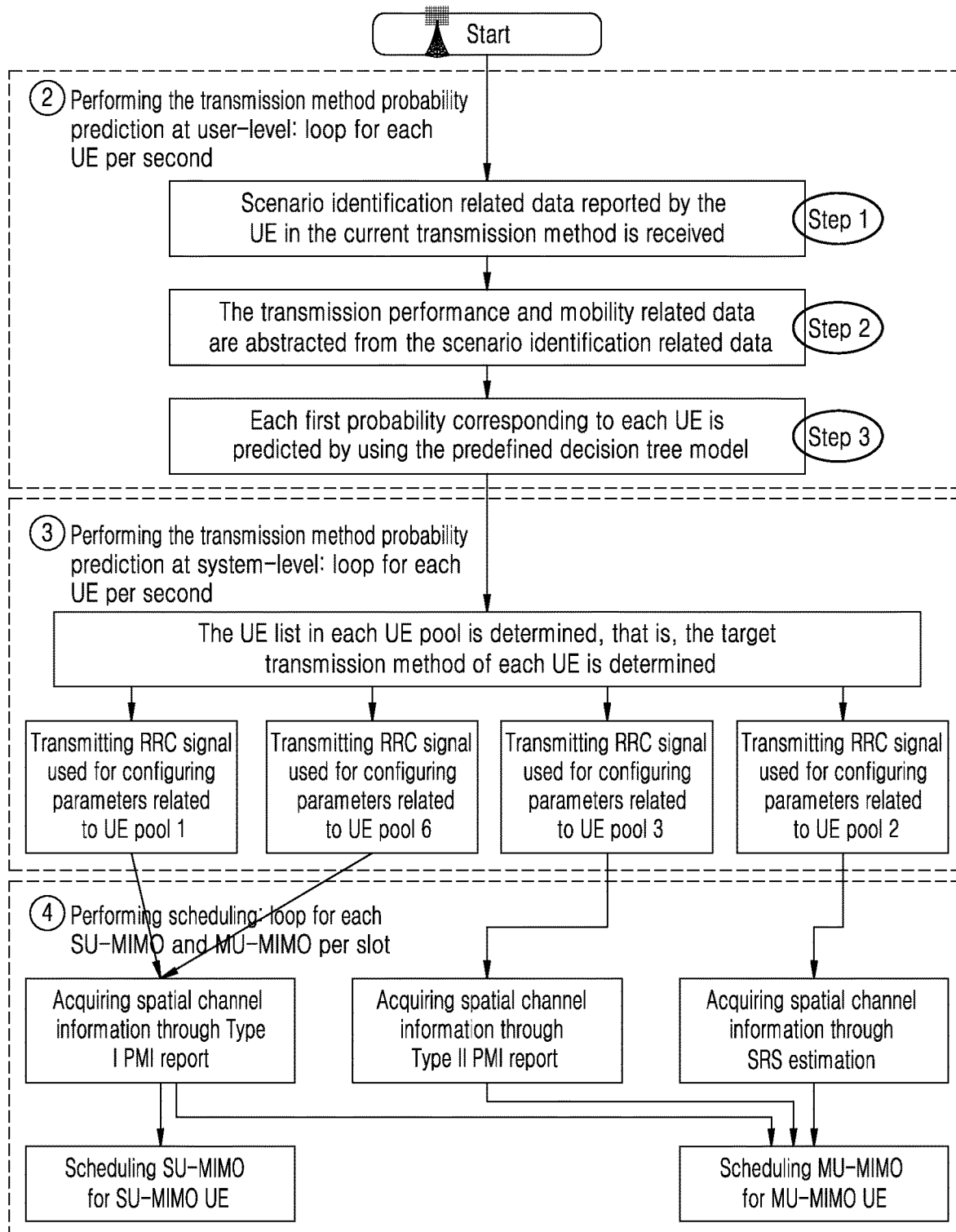
FIG. 9 is a schematic diagram of the overall flow illustrating a method for switching transmission methods in a massive MIMO system according to an example of an embodiment of the present disclosure.

The following uses an example to further illustrate the method for switching transmission methods provided in the embodiment of the present disclosure. As shown in FIG. 9, the method may include the following steps.

① The base station starts to execute the method for switching transmission methods of the present disclosure, and initializes the UE pool 1 corresponding to TM1, the UE pool 2 corresponding to TM2, the UE pool 3 corresponding to TM3, and the UE pool 6 corresponding to TM6, respectively.

② The transmission method probability prediction at user-level is performed, and the UE's target transmission method is determined from at least two predefined transmission methods based on scenario identification related data. Specifically, it may include the following steps:

At Step 1, scenario identification related data reported by the UE in the current transmission method is received.

At Step 2, the transmission performance and mobility related data are abstracted from the scenario identification related data, that is, characteristic abstraction is performed on the scenario identification related data reported by each UE to obtain the corresponding scenario identification related characteristic data.

At Step 3, each first probability corresponding to each UE is predicted by using the predefined decision tree model, that is, the scenario identification related characteristic data corresponding to each UE is input into the predefined decision tree model, and each first probability corresponding to each UE is output.

③ The transmission method probability prediction (also referred to as joint decision) at the system-level is performed, that is, based on the first probability corresponding to each UE, the UE is added to the corresponding UE pool of each predefined transmission method, and the target transmission method of the UE is determined from at least two predefined transmission methods in combination with at least one of terminal capability requirement, system resource restriction, and multi-user number requirement of the predefined transmission method. In other words, the current UE list in the UE pool of each predefined transmission is determined. And parameters related to the corresponding transmission method are configured for the UEs in each UE pool through the RRC signal.

④ The scheduling is performed, that is, the scheduling and transmission of the corresponding target transmission method is performed for the UE. Specifically, the corresponding SU-MIMO and MU-MIMO scheduling is performed for the UE in the system, and the spatial channel information reported by the UE is received based on the corresponding transmission method.

In order to verify the implementation effect of the embodiment of the present disclosure, the AI classification algorithm of the decision tree is used to train and predict the expectation of PDSCH transmission mode of the embodiment of the present disclosure. Through the base station log information in the external-field, the transmission method of PDSCH are learned and trained, and the learned and trained method is used to compare with the base station log detection results of the another external-field. Through comparison, it is found that the accuracy of the method for determining the PDSCH transmission mode exceeds 90%.

Because the training process of the AI model is implemented once and used for a long time; on the other hand, the training of this model may be completed by the base station, and the complexity is negligible.

Compared with the condition-based transmission method adaption method including two transmission methods, the AI-based transmission method adaption method in the embodiment of the present disclosure may obtain more than 30% of the system throughput gain at most in a mobility scenario as shown in the system simulation results. In a non-mobility scenario, because the transmission method is determined based on comprehensive consideration of multiple scenario factors, compared with the condition-based transmission method adaption method including two transmission methods, the transmission method may also obtain 30% system throughput gain at most as shown in the system simulation results.

Figure 10:
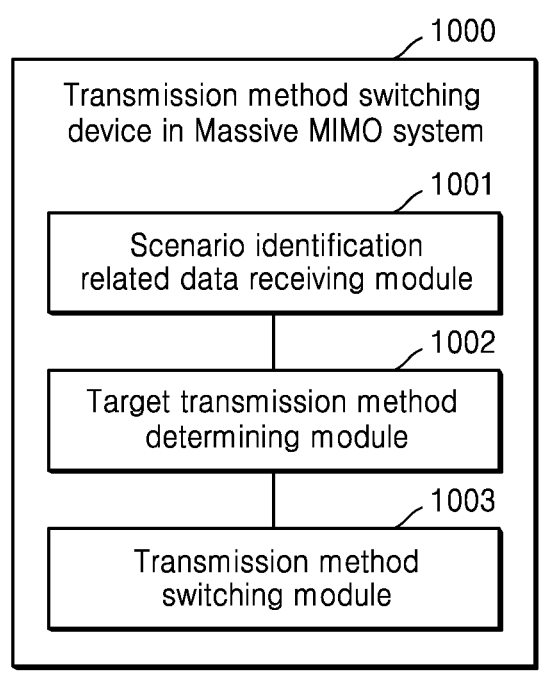
FIG. 10 is a structural block diagram of a transmission method switching device in a Massive MIMO system provided in an embodiment of the present disclosure.

FIG. 10 is a structural block diagram of a transmission method switching device in a Massive MIMO system provided in an embodiment of the present application. As shown in FIG. 10, the device 1000 may include: a scenario identification related data receiving module 1001, a target transmission method determining module 1002, and a transmission method switching module 1003.

The scenario identification related data receiving module 1001 is configured to receive scenario identification related data reported by a user equipment (UE) in a current transmission method.

The target transmission method determining module 1002 is configured to determine a target transmission method of the UE from at least two predefined transmission methods based on the scenario identification related data.

The transmission method switching module 1003 is configured to switch a transmission method of the UE from the current transmission method to the target transmission method.

In the method for switching transmission methods provided in the present disclosure, based on the scenario identification related data reported by the UE, the UE determines the target transmission method that matches the scenario, so that during the transmission method switching process, there are more selectable transmission methods, and the throughput and spectral efficiency of the system after switching the transmission method are improved.

In an embodiment of the present disclosure, the predefined transmission methods include at least two of the following predefined transmission methods: a predefined transmission method corresponding to single-user MIMO (SU-MIMO) based on Type I codebook feedback Precoding Matrix Indicator (PMI) (hereafter referred as Type I codebook PMI based SU-MIMO), a predefined transmission method corresponding to Multi-User MIMO (MU-MIMO) based on Sounding Reference Signal (SRS) (hereafter referred as SRS based MU-MIMO), a predefined transmission method corresponding to MU-MIMO based on Type II codebook feedback PMI (hereafter referred as Type II codebook PMI based MU-MIMO), a predefined transmission method corresponding to SU-MIMO based on SRS (SRS based SU-MIMO), a predefined transmission method corresponding to SU-MIMO based on Type II codebook feedback PMI (hereafter referred as Type II codebook PMI based SU-MIMO), a predefined transmission method corresponding to MU-MIMO based on Type I codebook feedback PMI (hereafter referred as Type I codebook PMI based MU- MIMO), a predefined transmission method corresponding to Open-loop SU-MIMO, and a predefined transmission method corresponding to Open-loop MU-MIMO.

In an embodiment of the present disclosure, the scenario identification related data includes at least one of the following data: an SRS channel estimation result, a spatial channel time correlation, a Channel Quality Indicator (CQI), a rank indicator (RI), a PMI, a Signal to Interference Plus Noise Ratio (SINR), an uplink Power Headroom Report (PHR), a Modulation Product Coding Rate (MPR), an Open-loop Rate Control (OLRC), a Reference Signal Receiving Power (RSRP), a Buffer Occupy (BO), the number of user data streams, the number of multi-user data transmission streams, a Modulation and Coding Scheme (MCS), a Block Error Ratio (BLER), a throughput, and a multi-user spatial channel correlation.

In an embodiment of the present disclosure, the target transmission method determining module is specifically used for: performing characteristic abstraction on the scenario identification related data to obtain corresponding scenario identification related characteristic data; and determining the target transmission method of the UE from the at least two predefined transmission methods based on scenario identification related characteristic data.

In an embodiment of the present disclosure, the target transmission method determining module is further used for: performing channel quality characteristic abstraction and mobility characteristic abstraction on the scenario identification related data to obtain corresponding scenario identification related characteristic data.

In an embodiment of the present disclosure, the target transmission method determining module is further used for: acquiring an average and/or variance of data values corresponding to the scenario identification related data in time units within a predefined duration, and using the average and/or variance as abstracted scenario identification related characteristic data.

In an embodiment of the present disclosure, the target transmission method determining module includes a first probability acquiring submodule and a first target transmission method determining submodule, wherein: the first probability acquiring submodule is used for acquiring a first probability corresponding to the UE enabling the mMIMO system to meet predetermined transmission performance in each predefined transmission method, based on the scenario identification related data; and the first target transmission method determining submodule is used for determining the target transmission method of the UE from the at least two predefined transmission methods based on each first probability corresponding to the UE.

In an embodiment of the present disclosure, the first probability acquiring submodule is specifically used for: inputting the scenario identification related data into a predefined probability prediction model, and acquiring the first probability corresponding to the UE obtaining a maximum throughput in each predefined transmission method.

In an embodiment of the present disclosure, the target transmission method determining submodule is specifically used for: determining the target transmission of the UE from the at least two predefined transmission methods based on each first probability corresponding to the UE, and in combination with at least one of terminal capability requirement, system resource restriction, and multi-user number requirement of each predefined transmission method.

In an embodiment of the present disclosure, the first target transmission method determining submodule specifically include a UE pool determining submodule, a second probability acquiring submodule and a second target transmission method determining submodule; the UE pool determining submodule is specifically used for adding the UE to a corresponding UE pool of the predefined transmission method corresponding to the maximum first probability, based on each first probability corresponding to the UE; the second probability acquiring submodule is used for adjusting each first probability corresponding to each UE in the corresponding UE pool to obtain each second probability corresponding to the UE, based on at least one of the terminal capability requirement, system resource restriction, and the multi-user number requirement of each predefined transmission method; and the second target transmission method determining submodule is used for determining the target transmission method of the UE from the at least two predefined transmission methods based on each second probability corresponding to the UE.

In an embodiment of the present disclosure, the second probability acquiring submodule is specifically used for: for the predefined transmission method having terminal capability requirement, setting the first probability corresponding to the UE that does not meet the terminal capability requirement in the UE pool in the predefined transmission method to a predefined value, and adjusting the first probability corresponding to the UE that does not meet the terminal capability requirement in other predefined transmission methods.

In an embodiment of the present disclosure, the second probability acquiring submodule is specifically used for: for the predefined transmission methods having system resource restriction, acquiring the maximum number of UEs corresponding to the system resource restriction, and sorting the UEs in the UE pool in descending order of the first probabilities corresponding to the UEs in the predefined transmission method; and setting a first probability corresponding to a UE with sequence number greater than the maximum number of UEs in the UE pool in the predefined transmission method to the predefined value, and adjusting the first probability corresponding to UE with sequence number greater than the maximum number of UEs in other predefined transmission methods.

In an embodiment of the present disclosure, the second probability acquiring submodule is further used for: for the predefined transmission methods corresponding to SRS based MU-MIMO and SRS based SU-MIMO, setting the first probability corresponding to the UE having no SRS capability in the UE pool in the two predefined transmission methods to the predefined value, and adjusting the first probability corresponding to the UE having no SRS capability in other predefined transmission methods.

In an embodiment of the present disclosure, the second probability acquiring submodule is specifically used for: for a predefined transmission method having multi-user number requirement, acquiring a minimum number of UEs corresponding to multi-user number requirement; and setting the first probabilities corresponding to all UEs in the predefined transmission method to the predefined value, if the number of UEs in the UE pool is less than the minimum number of UEs, and adjusting the first probabilities corresponding to all UEs in other predefined transmission methods.

In an embodiment of the present disclosure, the second probability acquiring submodule is further used for: for predefined transmission methods corresponding to SRS based MU-MIMO and SRS based SU-MIMO, acquiring the maximum number of UEs corresponding to the SRS system resource restriction, and sorting the UEs in the UE pool in descending order of the first probabilities corresponding to the UEs in the predefined transmission method; and setting the first probabilities corresponding to the UE with sequence number greater than the maximum number of UEs in the UE pool in the two predefined transmission methods to the predefined value, and adjusting the first probability corresponding to UE with sequence number greater than the maximum number of UEs in other predefined transmission methods.

In an embodiment of the present disclosure, the second target transmission method determining submodule is specifically used for: determining the predefined transmission method corresponding to the largest second probability corresponding to the UE as the target transmission method of the UE.

In an embodiment of the present disclosure, the second probability acquiring submodule is further used for: for predefined transmission methods corresponding to SRS based MU-MIMO, Type II codebook PMI based MU-MIMO, Type I codebook PMI based MU-MIMO and Open-loop MU-MIMO, acquiring a minimum number of UEs corresponding to the multi-user number requirement; and setting the first probabilities corresponding to all UEs in the four predefined transmission methods to the predefined value, if the number of UEs in the UE pool is less than the minimum number of UEs, and adjusting the first probabilities corresponding to all UEs in other predefined transmission methods.

In an embodiment of the present disclosure, the transmission method switching module is specifically used for: transmitting configuration parameters corresponding to the target transmission method to the UE, and performing corresponding scheduling and transmission on the UE.

Figure 11:
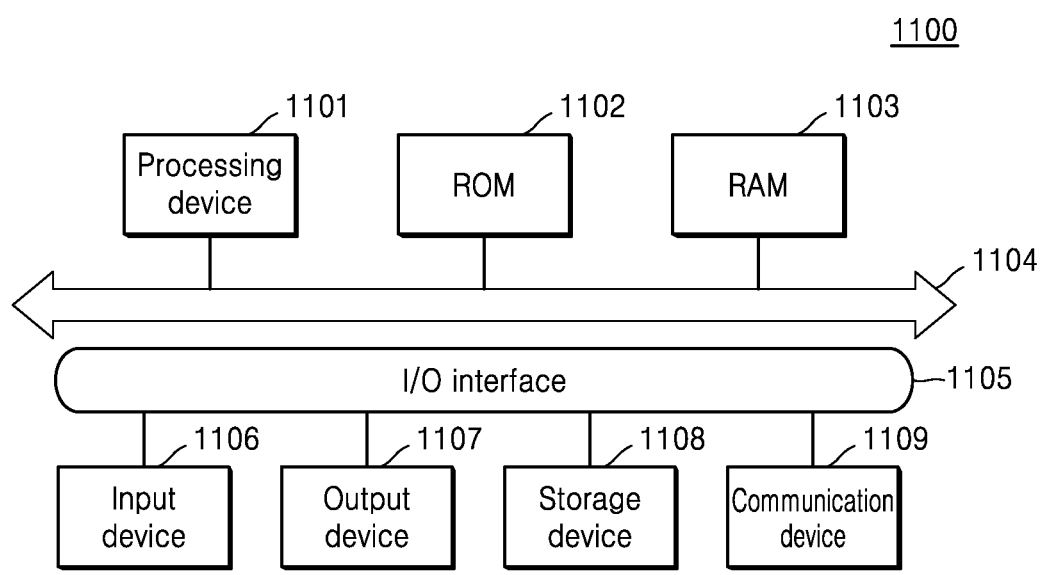
FIG. 11 is a schematic structural diagram of an electronic device provided in an embodiment of the present disclosure.

Hereafter, FIG. 11 shows a schematic structural diagram of an electronic device (for example, a terminal device or a server that executes the method shown in FIG. 3) 1100 suitable for implementing the embodiments of the present disclosure. The electronic devices in the embodiments of the present disclosure may include, but are not limited to, mobile terminals such as mobile phones, notebook computers, digital broadcast receivers, personal digital assistants (PDAs), tablet computers (PADs), PMPs (portable multimedia players), vehicle-mounted terminals (for example, vehicle-mounted navigation terminals), and wearable devices, and fixed terminals such as digital TVs, desktop computers, etc. The electronic device shown in FIG. 11 is only an example, and should not bring any limitation to the functions and scope of use of the embodiments of the present disclosure.

The electronic device includes a memory and a processor, where the memory is used to store programs for executing the methods described in the foregoing method embodiments; the processor is configured to execute the programs stored in the memory. The processor here may be referred to as the processing device 1101 described below, and the memory may include at least one of a read-only memory (ROM) 1102, a random access memory (RAM) 1103, and a storage device 1108, specifically as shown below:

As shown in FIG. 11, the electronic device 1100 may include a processing device (such as a central processor, a graphics processor, etc.) 1101, which may execute various appropriate actions and processes according to programs stored in a read-only memory (ROM) 1102 or programs loaded into a random access memory (RAM) 1103 from storage device 1108. In the RAM 1103, various programs and data required for the operation of the electronic device 1100 are also stored. The processing device 1101, the ROM 1102, and the RAM 1103 are connected to each other through a bus 1104. An input/output (I/O) interface 1105 is also connected to the bus 1104.

Generally, the following devices may be connected to the I/O interface 1105: an input device 1106 including, for example, touch screen, touch pad, keyboard, mouse, camera, microphone, accelerometer, gyroscope, etc.; an output device 1107 including, for example, liquid crystal display (LCD), speakers, vibrator; a storage device 1108 including, for example, a magnetic tape, a hard disk, etc.; and a communication device 1109. The communication device 1109 may allow the electronic device 1100 to perform wireless or wired communication with other devices to exchange data. Although FIG. 11 shows an electronic device having various devices, it should be understood that it is not required to implement or have all the illustrated devices. It may alternatively be implemented or provided with more or fewer devices.

In particular, according to the embodiments of the present disclosure, the process described above with reference to the flowchart can be implemented as a computer software program. For example, the embodiments of the present disclosure include a computer program product, which includes a computer program carried on a non-transitory computer readable medium, and the computer program includes program code for executing the method shown in the flowchart. In such an embodiment, the computer program may be downloaded and installed from the network through the communication device 1109, or installed from the storage device 1108, or installed from the ROM 1102. When the computer program is executed by the processing device 1101, the above-mentioned functions defined in the method of the embodiment of the present disclosure are executed.

It should be noted that the above-mentioned computer-readable storage medium in the present disclosure may be a computer-readable signal medium or a computer-readable storage medium, or any combination thereof. The computer-readable storage medium may be, for example, but not limited to, an electrical, magnetic, optical, electromagnetic, infrared ray, or semiconductor system, apparatus, or device, or any combination of the above. More specific examples of computer-readable storage media may include, but are not limited to: electrical connections with one or more wires, portable computer disks, hard disks, random access memory (RAM), read-only memory (ROM), Erasable Programmable Read-only Memory (EPROM or flash), optical fiber, portable compact disk read-only memory (CD-ROM), optical storage device, magnetic storage device, or any suitable combination thereof. In the present disclosure, the computer-readable storage medium may be any tangible medium that contains or stores a program, and the program may be used by or in combination with an instruction execution system, apparatus, or device. In the present disclosure, the computer-readable signal medium may include a data signal, on which a computer-readable program code is carried, propagated in a baseband or as a part of a carrier wave. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium may be transmitted by any suitable medium, including but not limited to: wire, optical cable, RF (radio frequency), etc., or any suitable combination thereof.

In some embodiments, the client and server may communicate using any currently known or future-developed network protocol such as HyperText Transfer Protocol (HTTP), and may communicate (for example, communication network) and interconnect with digital data in any form or medium. Examples of communication networks include local area networks ("LAN"), wide area networks ("WAN"), the Internet (Net), and end-to-end networks (for example, ad hoc end-to-end networks), as well as any net which is currently known or will be researched and developed in the future.

The above-mentioned computer-readable medium may be included in the above-mentioned electronic device; or it may exist separately without being assembled into the electronic device.

The above-mentioned computer-readable medium carries one or more programs, and when the above-mentioned one or more programs are executed by the electronic device, the electronic device: receives scenario identification related data reported by the user equipment UE in the current transmission method; determines the UE's target transmission method from at least two predefined transmission methods based on the scenario recognition related data; and switches the UE's transmission method from the current transmission method to the target transfer method.

The computer program code used to perform the operations of the present disclosure may be written in one or more programming languages or a combination thereof. The above-mentioned programming languages include but are not limited to object-oriented programming languages, such as Java, Smalltalk, C++, and include conventional procedural programming languages, such as "C" language or similar programming languages. The program code may be executed entirely on the user's computer, partly executed on the user's computer, executed as an independent software package, partly executed on the user's computer and partly executed on a remote computer, or entirely executed on a remote computer or server. In the case of a remote computer, the remote computer may be connected to the user's computer through any kind of network including a local area network (LAN) or a wide area network (WAN), or it can be connected to an external computer (for example, through Internet connection provided by an Internet service provider).

The flowcharts and block diagrams in the drawings illustrate the possible implementation of the system architecture, functions, and operations of the system, method, and computer program product according to various embodiments of the present disclosure. In this regard, each block in the flowchart or block diagram may represent a module, program segment, or part of code, and the module, program segment, or part of code contains one or more executable instruction(s) for implementing the specified logical function. It should also be noted that, in some alternative implementations, the functions marked in the block may also occur in a different order from the order marked in the drawings. For example, two blocks shown in succession may actually be executed substantially in parallel, and may sometimes be executed in the reverse order, depending on the functions involved. It should also be noted that each block in the block diagram and/or flowchart, and the combination of the blocks in the block diagram and/or flowchart, may be implemented by a dedicated hardware-based system that performs the specified functions or operations, may be implemented by a combination of dedicated hardware and computer instructions.

The modules or units involved in the embodiments described in the present disclosure may be implemented in software or hardware, where the name of the module or unit does not constitute a limitation on the unit itself under certain circumstances. For example, a scenario identification related data receiving module may also be described as a "module for acquiring recognition related data".

The above-described functions herein may be performed at least in part by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of machine-readable storage media would include electrical connections based on one or more wires, portable computer disks, hard drives, random access memory (RAM), read-only memory (ROM), erasable programmable read-only memory (EPROM or flash memory), optical fiber, portable compact disk read only memory (CD-ROM), optical storage device, magnetic storage device, or any suitable combination thereof.

The device provided in the embodiment of the present disclosure may implement at least one of the multiple modules through an AI model. The functions associated with AI may be performed by a non-volatile memory, a volatile memory, and a processor.

The processor may include one or more processors. At this time, the one or more processors may be general-purpose processors, such as central processing unit (CPU), application processor (AP), etc., or pure graphics processing units, such as graphics processing unit (GPU), visual processing Unit (VPU), and/or AI dedicated processor, such as neural processing unit (NPU).

The one or more processors control the processing of input data according to predefined operating rules or artificial intelligence (AI) models stored in non-volatile memory and volatile memory. Predefined operating rules or artificial intelligence models are provided through training or learning.

Here, providing through learning refers to obtaining predefined operating rules or AI models with desired characteristics by applying learning algorithms to multiple learning data. This learning may be performed in the device in which the AI according to the embodiment is performed, and/or may be implemented by a separate server/system.

The AI model may contain multiple neural network layers. Each layer has multiple weight values, and the calculation of one layer is performed by the calculation result of the previous layer and multiple weights of the current layer. Examples of neural networks include, but are not limited to, convolutional neural networks (CNN), deep neural networks (DNN), recurrent neural networks (RNN), restricted Boltzmann machines (RBM), deep belief networks (DBN), bidirectional loops Deep Neural Network (BRDNN), Generative Adversarial Network (GAN), and Deep Q Network.

A learning algorithm is a method of training a predetermined target device (for example, a robot) using a plurality of learning data to make, allow, or control the target device to make determination or prediction. Examples of the learning algorithm include, but are not limited to, supervised learning, unsupervised learning, semi-supervised learning, or reinforcement learning.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for switching transmission methods in a multiple input multiple output (MIMO) system, the method comprising:
receiving scenario identification related data from a user equipment (UE) in a current transmission method;
determining a target transmission method of the UE from at least two predefined transmission methods based on the scenario identification related data; and
switching the current transmission method of the UE to the target transmission method,
wherein the at least two predefined transmission methods comprise at least two of the following predefined transmission methods:
a first transmission method corresponding to single-user MIMO (SU-MIMO) based on Type I codebook feedback Precoding Matrix Indicator (PMI) (Type I codebook PMI based SU-MIMO), a second transmission method corresponding to Multi-User MIMO (MU-MIMO) based on Sounding Reference Signal (SRS) (SRS based MU-MIMO), a third transmission method corresponding to MU-MIMO based on Type II codebook feedback PMI (Type II codebook PMI based MU-MIMO), a fourth transmission method corresponding to SU-MIMO based on SRS (SRS based SU-MIMO), a fifth transmission method corresponding to SU-MIMO based on Type II codebook feedback PMI (Type II codebook PMI based SU-MIMO), a sixth transmission method corresponding to MU-MIMO based on Type I codebook feedback PMI (Type I codebook PMI based MU-MIMO), a seventh transmission method corresponding to Open-loop SU-MIMO, and an eighth transmission method corresponding to Open-loop MU-MIMO.

2. The method of claim 1, wherein the scenario identification related data comprises at least one of the following data:
an SRS channel estimation result, a spatial channel time correlation, a Channel Quality Indicator (CQI), a rank indicator (RI), a PMI, a Signal to Interference Plus Noise Ratio (SINR), an uplink Power Headroom Report (MAR), a Modulation Product Coding Rate (MPR), an Open-loop Rate Control (OLRC), a Reference Signal Receiving Power (RSRP), a Buffer Occupy (BO), a number of user data streams, a number of multi-user data transmission streams, a Modulation and Coding Scheme (MCS), a Block Error Ratio (BLER), a throughput, and a multi-user spatial channel correlation.

3. The method of claim 1, wherein the determining the target transmission method comprises:
performing characteristic abstraction on the scenario identification related data to obtain scenario identification related characteristic data; and
determining the target transmission method of the UE based on the scenario identification related characteristic data.

4. The method of claim 3, wherein the performing characteristic abstraction on the scenario identification related data comprises:
obtaining information of a channel quality and a mobility of the UE, from the scenario identification related data to obtain the scenario identification related characteristic data.

5. The method of claim 4, wherein the obtaining the information of the channel quality and the mobility of the UE comprises:
acquiring either one or both of an average and a variance of data values corresponding to the scenario identification related data in time units within a predefined duration, and using either one or both of the average and the variance as the scenario identification related characteristic data.

6. The method of claim 1, wherein the determining the target transmission method comprises:
acquiring a first probability that the UE enables the MIMO system to meet a predetermined transmission performance in each of the at least two predefined transmission methods, based on the scenario identification related data; and
determining the target transmission method based on each first probability corresponding to the UE.

7. The method of claim 6, wherein the acquiring the first probability comprises:
inputting the scenario identification related data into an artificial intelligence (AI)-based probability prediction model, and acquiring, as an output of the AI-based probability prediction model, the first probability that the UE obtains a maximum throughput in each of the at least two predefined transmission methods.

8. The method of claim 6, wherein the determining the target transmission method further comprises:
determining the target transmission method based on the first probability corresponding to the UE in each of the at least two predefined transmission methods, in combination with at least one of a terminal capability requirement, a system resource restriction, and a multi-user number requirement of each of the at least two predefined transmission methods.

9. The method of claim 8, wherein the determining the target transmission method further comprises:
adding the UE to a corresponding UE pool of one of the at least two predefined transmission methods that corresponds to a maximum first probability, among each first probability corresponding to the UE;
adjusting each first probability corresponding to each UE in the corresponding UE pool to obtain each second probability corresponding to the UE, based on at least one of the terminal capability requirement, the system resource restriction, and the multi-user number requirement of each of the at least two predefined transmission methods; and determining the target transmission method of the UE from the at least two predefined transmission methods based on each second probability corresponding to the UE.

10. The method of claim 9, wherein, for the one of the at least two predefined transmission methods having the terminal capability requirement, the adjusting each first probability corresponding to each UE in the corresponding UE pool, based on at least one of the terminal capability requirement, system resource restriction, and the multi-user number requirement comprises:
setting the first probability corresponding to the UE that does not meet the terminal capability requirement in the corresponding UE pool to a predefined value; and
adjusting the first probability corresponding to the UE that does not meet the terminal capability requirement in other predefined transmission methods.

11. The method of claim 10, wherein for the at least two predefined transmission methods corresponding to SRS based MU-MIMO and SRS based SU-MIMO, the adjusting each first probability corresponding to each UE in the corresponding UE pool, based on the terminal capability requirements of the at least two predefined transmission methods comprises:
setting the first probability corresponding to the UE having no SRS capability in the UE pool in the at least two predefined transmission methods to the predefined value, and adjusting the first probability corresponding to the UE having no SRS capability in other predefined transmission methods.

12. The method of claim 9, wherein for the one of the at least two predefined transmission methods having the system resource restriction, the adjusting the first probability corresponding to each UE in the corresponding UE pool, comprises:
acquiring a maximum number of UEs corresponding to the system resource restriction, and sorting the UEs in the UE pool in descending order of the first probabilities corresponding to the UEs in the one of the at least two predefined transmission method; and
setting a first probability corresponding to a UE with a sequence number greater than the maximum number of UEs in the UE pool in the one of the at least two predefined transmission methods to a predefined value, and adjusting the first probability corresponding to the UE with the sequence number greater than the maximum number of UEs in other predefined transmission methods.

13. The method of claim 12, wherein for the at least two predefined transmission methods corresponding to SRS based MU-MIMO and SRS based SU-MIMO, the adjusting each first probability corresponding to each UE in the corresponding UE pool, based on the system resource restriction of the at least two predefined transmission methods comprises:
acquiring the maximum number of UEs corresponding to the SRS system resource restriction, and sorting the UEs in the UE pool in descending order of the first probabilities corresponding to the UEs in the one of the at least two predefined transmission method; and
setting the first probabilities corresponding to the UE with the sequence number greater than the maximum number of UEs in the UE pool in the two predefined transmission methods to the predefined value, and adjusting the first probability corresponding to the UE with the sequence number greater than the maximum number of UEs in other predefined transmission methods.

14. The method of claim 9, wherein for the one of the at least two predefined transmission method having the multi-user number requirement, the adjusting the first probability corresponding to each UE in the corresponding UE pool, based on at least one of the terminal capability requirement, system resource restriction, and the multi-user number requirement comprises:
acquiring a minimum number of UEs corresponding to the multi-user number requirement; and
setting the first probabilities corresponding to all UEs in the one of the at least two predefined transmission methods to a predefined value, based on a number of UEs in the UE pool being less than the minimum number of UEs, and adjusting the first probabilities corresponding to all UEs in other predefined transmission methods.

15. The method of claim 14, wherein for the at least two predefined transmission methods comprising a first transmission method, a second transmission method, a third transmission method, and a fourth transmission method that correspond to SRS based MU-MIMO, Type II codebook PMI based MU-MIMO, Type I codebook PMI based MU-MIMO and Open-loop MU-MIMO, respectively, and
wherein the adjusting the first probability corresponding to each UE in the corresponding UE pool based on at least one of the multi-user number requirements of the first, the second, the third, and the fourth transmission methods comprises:
acquiring the minimum number of UEs corresponding to the multi-user number requirement; and
setting the first probabilities corresponding to all UEs in the first, the second, the third, and the fourth transmission methods to the predefined value, based on the number of UEs in the UE pool being less than the minimum number of UEs, and adjusting the first probabilities corresponding to all UEs in other predefined transmission methods.

16. The method of claim 9, wherein the determining the target transmission method of the UE based on each second probability corresponding to the UE comprises:
determining one of the at least two predefined transmission methods that corresponds to a largest second probability corresponding to the UE as the target transmission method of the UE.

17. The method of claim 1, wherein the switching from the current transmission method to the target transmission method comprises:
transmitting configuration parameters corresponding to the target transmission method to the UE, and performing corresponding scheduling and transmission on the UE.

18. A Multiple Input Multiple Output (MIMO) system comprising one or more processors configured to:
a receive scenario identification related data from a user equipment (UE) in a current transmission method;
determine a target transmission method of the UE from at least two predefined transmission methods based on the scenario identification related data; and switch the current transmission method of the UE to the target transmission method, wherein the at least two predefined transmission methods comprise at least two of the following predefined transmission methods:

a first transmission method corresponding to single-user MIMO (SU-MIMO) based on Type I codebook feedback Precoding Matrix Indicator (PMI) (Type I codebook PMI based SU-MIMO), a second transmission method corresponding to Multi-User MIMO (MU-MIMO) based on Sounding Reference Signal (SRS) (SRS based MU-MIMO), a third transmission method corresponding to MU-MIMO based on Type II codebook feedback PMI (Type II codebook PMI based MU-MIMO), a fourth transmission method corresponding to SU-MIMO based on SRS (SRS based SU-MIMO), a fifth transmission method corresponding to SU-MIMO based on Type II codebook feedback PMI (Type II codebook PMI based SU-MIMO), a sixth transmission method corresponding to MU-MIMO based on Type I codebook feedback PMI (Type I codebook PMI based MU-MIMO), a seventh transmission method corresponding to Open-loop SU-MIMO, and an eighth transmission method corresponding to Open-loop MU-MIMO.

19. A non-transitory computer readable storage medium, storing a computer program that is executable by one or more processors to perform a method of controlling a user equipment (UE) in a multiple input multiple output (MIMO) system, the method comprising:

obtaining mobility information and channel quality information of the UE in a current transmission method;

predicting a probability that the UE obtains a maximum throughput in each of a plurality of transmission methods, by inputting the mobility information and the channel quality information of the UE to an artificial intelligence (AI)-based probability prediction model;

determining, as a target transmission method of the UE, one of the plurality of transmission methods that has a higher probability among the probability corresponding to each of the plurality of transmission methods; and switching the current transmission method of the UE to the target transmission method.

* * * * *